United States Patent
Dutta et al.

(10) Patent No.: US 12,176,993 B2
(45) Date of Patent: Dec. 24, 2024

(54) INTELLIGENT SURFACE ENABLED TECHNIQUES FOR INTERFERENCE MANAGEMENT

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US); Mahmoud Ashour, San Diego, CA (US); Himaja Kesavareddigari, Bridgewater, NJ (US); Kyle Chi Guan, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 17/847,447

(22) Filed: Jun. 23, 2022

(65) Prior Publication Data

US 2023/0421240 A1    Dec. 28, 2023

(51) Int. Cl.
| | |
|---|---|
| *H04B 7/145* | (2006.01) |
| *H04W 24/10* | (2009.01) |
| *H04W 36/06* | (2009.01) |
| *H04W 72/541* | (2023.01) |
| *H04W 72/542* | (2023.01) |

(52) U.S. Cl.
CPC ............ *H04B 7/145* (2013.01); *H04W 24/10* (2013.01); *H04W 36/06* (2013.01); *H04W 72/541* (2023.01); *H04W 72/542* (2023.01)

(58) Field of Classification Search
CPC ... H04B 7/04013; H04B 7/145; H04W 24/02; H04W 24/10; H04W 36/06; H04W 72/541; H04W 72/542
See application file for complete search history.

(56) References Cited

U.S. PATENT DOCUMENTS

| | | | |
|---|---|---|---|
| 2022/0014935 A1* | 1/2022 | Haija | ................... H04L 5/0048 |
| 2022/0052764 A1 | 2/2022 | Medra et al. | |

(Continued)

OTHER PUBLICATIONS

International Search Report and Written Opinion—PCT/US2023/023829—ISA/EPO—Oct. 24, 2023 (2202938WO).

(Continued)

*Primary Examiner* — Nguyen T Vo
(74) *Attorney, Agent, or Firm* — Dalei Dong; Holland & Hart LLP

(57) ABSTRACT

Methods, systems, and devices for wireless communications are described. The described techniques support communication between one or more network entities and user equipment (UEs) via configurable intelligent surfaces. A first UE may transmit, to a second UE associated with a set of configurable intelligent surfaces, first information that indicates a tracking period and a data period that the second UE is to use to manage the configurable intelligent surfaces. The second UE may adjust the configurable intelligent surfaces for the communications between the first UE and network entities during the tracking period and the data period. The second UE may adjust the configurable intelligent surfaces based on measurement reports generated by the first UE based on communication during the tracking and data periods.

30 Claims, 12 Drawing Sheets

(56) References Cited

U.S. PATENT DOCUMENTS

| | | | | |
|---|---|---|---|---|
| 2023/0189021 A1* | 6/2023 | Ali | ................... | H04W 72/0446 |
| | | | | 370/252 |
| 2023/0283357 A1* | 9/2023 | Wei | ................... | H04B 7/15557 |
| | | | | 455/11.1 |
| 2023/0284055 A1* | 9/2023 | Wei | ...................... | H04L 5/0032 |
| | | | | 370/252 |
| 2023/0396299 A1* | 12/2023 | Yang | ..................... | H04L 5/0016 |
| 2024/0073882 A1* | 2/2024 | Yang | ................. | H04B 7/04013 |

OTHER PUBLICATIONS

Wymeersch H., et al., "Radio Localization and Mapping with Reconfigurable Intelligent Surfaces: Challenges, Opportunities, and Research Directions", IEEE Vehicular Technology Magazine, IEEE, US, vol. 15, No. 4, Oct. 7, 2020, 10 Pages, XP011821427, pp. 52-61, The whole document, Abstract p. 52, right-hand col., para. 1—p. 55, left-hand col., para. 3, p. 57, right-hand col., para. 1—p. 58, right-hand col., para. 2 fig. 1,2,4—p. 59, right-hand col., last para. Fig. 1-4.

Zhu Q., et al., "Dynamic Wireless Networks Assisted by RIS Mounted on Aerial Platform: Joint Active and Passive Beamforming Design", ITE Communications, The Institution of Engineering and Technology, GB, vol. 16, No. 13, Apr. 21, 2022, pp. 1509-1522, XP006116373, The Whole Document.

\* cited by examiner

INTELLIGENT SURFACE ENABLED TECHNIQUES FOR INTERFERENCE MANAGEMENT

FIELD OF DISCLOSURE

The following relates to wireless communications, including intelligent surface enabled techniques for interference management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, communications may occur between the outside network entity and one or more UEs inside a vehicle. In such instances, communication between the network entities and the UEs may suffer from outside to inside penetration losses, blocking, interference, or other communication issues. As such, mechanisms to support successful transmissions and receptions of signals in a vehicular environment is desired.

SUMMARY

The described techniques relate to improved methods, systems, devices, and apparatuses that support intelligent surface enabled techniques for interference management. For example, the described techniques provide for communication between one or more network entities and user equipment (UEs) via configurable intelligent surfaces. A first UE may transmit, to a second UE associated with a set of configurable intelligent surfaces, first information that indicates a tracking period and a data period that the second UE is to use to manage the configurable intelligent surfaces. The second UE may adjust the configurable intelligent surfaces for the communications between the first UE and network entities during the tracking period and the data period. The second UE may adjust the configurable intelligent surfaces based on measurement reports generated by the first UE using the communication during the tracking and data periods.

A method for wireless communications at a first UE is described. The method may include transmitting, to a second UE associated with a set of configurable intelligent surfaces, first information that indicates a tracking period and a data period that the second UE is to use for management of the set of configurable intelligent surfaces, communicating, via the set of configurable intelligent surfaces, with a set of multiple network entities during the tracking period, transmitting, to the second UE, second information indicating a measurement report associated with the communicating during the tracking period, and communicating, via the set of configurable intelligent surfaces and based on the measurement report, with a subset of network entities of the set of multiple network entities during the data period.

An apparatus for wireless communications at a first UE is described. The apparatus may include a processor, memory coupled with the processor, and instructions stored in the memory. The instructions may be executable by the processor to cause the apparatus to transmit, to a second UE associated with a set of configurable intelligent surfaces, first information that indicates a tracking period and a data period that the second UE is to use for management of the set of configurable intelligent surfaces, communicate, via the set of configurable intelligent surfaces, with a set of multiple network entities during the tracking period, transmit, to the second UE, second information indicating a measurement report associated with the communicating during the tracking period, and communicate, via the set of configurable intelligent surfaces and based on the measurement report, with a subset of network entities of the set of multiple network entities during the data period.

Another apparatus for wireless communications at a first UE is described. The apparatus may include means for transmitting, to a second UE associated with a set of configurable intelligent surfaces, first information that indicates a tracking period and a data period that the second UE is to use for management of the set of configurable intelligent surfaces, means for communicating, via the set of configurable intelligent surfaces, with a set of multiple network entities during the tracking period, means for transmitting, to the second UE, second information indicating a measurement report associated with the communicating during the tracking period, and means for communicating, via the set of configurable intelligent surfaces and based on the measurement report, with a subset of network entities of the set of multiple network entities during the data period.

A non-transitory computer-readable medium storing code for wireless communications at a first UE is described. The code may include instructions executable by a processor to transmit, to a second UE associated with a set of configurable intelligent surfaces, first information that indicates a tracking period and a data period that the second UE is to use for management of the set of configurable intelligent surfaces, communicate, via the set of configurable intelligent surfaces, with a set of multiple network entities during the tracking period, transmit, to the second UE, second information indicating a measurement report associated with the communicating during the tracking period, and communicate, via the set of configurable intelligent surfaces and based on the measurement report, with a subset of network entities of the set of multiple network entities during the data period.

In some examples of the method, apparatuses, and non-transitory computer-readable medium described herein, transmitting the first information that indicates the tracking period and the data period may include operations, features, means, or instructions for transmitting an indication of a timing offset, a periodicity, an expiration timer, or a combination thereof, that defines a pattern of the tracking period and the data period.

In some examples of the method, apparatuses, and non-transitory computer-readable medium described herein, transmitting the second information indicating the measurement report may include operations, features, means, or instructions for transmitting, to the second UE, a request that the second UE perform an interference cancellation adjustment to the set of configurable intelligent surfaces.

In some examples of the method, apparatuses, and non-transitory computer-readable medium described herein, transmitting the second information indicating the measurement report may include operations, features, means, or instructions for transmitting signaling indicating the measurement report based on determining that a secondary cell may be within a threshold receive power of a primary cell receive power.

In some examples of the method, apparatuses, and non-transitory computer-readable medium described herein, transmitting the second information indicating the measurement report may include operations, features, means, or instructions for transmitting an indication of a signal metric that may be a received signal strength, a received signal quality, or both for each of the set of multiple network entities based on the communicating during the tracking period.

In some examples of the method, apparatuses, and non-transitory computer-readable medium described herein, the measurement report indicates the signal metric relative to a prior measurement of the signal metric for each of the set of multiple network entities.

Some examples of the method, apparatuses, and non-transitory computer-readable medium described herein may further include operations, features, means, or instructions for transmitting, to the second UE, an indication of second measurement report associated with the communicating with the subset of the network entities during the data period.

In some examples of the method, apparatuses, and non-transitory computer-readable medium described herein, transmitting the second information indicating the measurement report may include operations, features, means, or instructions for transmitting an indication of a signal metric associated with data reception during the data period, where the signal metric may be received signal strength associated with the data reception during the data period, a received signal quality associated with data reception during the data period, or both.

In some examples of the method, apparatuses, and non-transitory computer-readable medium described herein, the second measurement report indicates the signal metric relative to a prior measurement of the signal metric for the subset of network entities.

Some examples of the method, apparatuses, and non-transitory computer-readable medium described herein may further include operations, features, means, or instructions for transmitting, to the second UE, location information associated with one or more network entities of the set of multiple network entities relative to the first UE.

In some examples of the method, apparatuses, and non-transitory computer-readable medium described herein, the location information indicates a distance metric or a zone identifier associated with each of the one or more network entities.

In some examples of the method, apparatuses, and non-transitory computer-readable medium described herein, the location information indicates that each of the one or more network entities may be a primary network entity or a secondary network entity.

In some examples of the method, apparatuses, and non-transitory computer-readable medium described herein, each of the one or more network entities may be indicated as the primary network entity or the second network entity on a data occasion basis.

Some examples of the method, apparatuses, and non-transitory computer-readable medium described herein may further include operations, features, means, or instructions for receiving, from the second UE, an indication of an increased interference for a period.

Some examples of the method, apparatuses, and non-transitory computer-readable medium described herein may further include operations, features, means, or instructions for transmitting, to a base station based on receiving the indication of increased interference, control signaling including an indication of the increased interference for the period.

Some examples of the method, apparatuses, and non-transitory computer-readable medium described herein may further include operations, features, means, or instructions for reducing a data rate for communications during the period.

In some examples of the method, apparatuses, and non-transitory computer-readable medium described herein, transmitting the second information indicating measurement report may include operations, features, means, or instructions for transmitting the second information over a side channel with the second UE, where the side channel may be a Bluetooth communication link, a Wi-fi link, a cellular sidelink, or a vehicle-to-everything communication link.

Some examples of the method, apparatuses, and non-transitory computer-readable medium described herein may further include operations, features, means, or instructions for receiving, from the second UE, an indication of one or more measurement occasions, where the measurement report includes measurements for the one or more measurement occasions.

In some examples of the method, apparatuses, and non-transitory computer-readable medium described herein, the one or more measurement occasions include at least one measurement occasion during the data period.

A method for wireless communications at a first UE is described. The method may include receiving, from a second UE, first information that indicates a tracking period and a data period that the first UE is to use for management of a set of configurable intelligent surfaces, adjusting the set of configurable intelligent surfaces to a first configuration for a first communication between the second UE and a set of multiple network entities to occur during the tracking period, receiving, from the second UE, signaling indicating a measurement report associated with the first communication occurring during the tracking period, and adjusting, based on the measurement report, the set of configurable intelligent surfaces to a second configuration for a second communication between the second UE and a subset of network entities of the set of multiple network entities to occur during the data period.

An apparatus for wireless communications at a first UE is described. The apparatus may include a processor, memory coupled with the processor, and instructions stored in the memory. The instructions may be executable by the processor to cause the apparatus to receive, from a second UE, first information that indicates a tracking period and a data period that the first UE is to use for management of a set of configurable intelligent surfaces, adjust the set of configurable intelligent surfaces to a first configuration for a first communication between the second UE and a set of multiple network entities to occur during the tracking period, receive, from the second UE, signaling indicating a measurement report associated with the first communication occurring during the tracking period, and adjust, based on the measurement report, the set of configurable intelligent surfaces to a second configuration for a second communication between the second UE and a subset of network entities of the set of multiple network entities to occur during the data period.

Another apparatus for wireless communications at a first UE is described. The apparatus may include means for receiving, from a second UE, first information that indicates a tracking period and a data period that the first UE is to use for management of a set of configurable intelligent surfaces, means for adjusting the set of configurable intelligent surfaces to a first configuration for a first communication between the second UE and a set of multiple network entities to occur during the tracking period, means for receiving, from the second UE, signaling indicating a measurement report associated with the first communication occurring during the tracking period, and means for adjusting, based on the measurement report, the set of configurable intelligent surfaces to a second configuration for a second communication between the second UE and a subset of network entities of the set of multiple network entities to occur during the data period.

A non-transitory computer-readable medium storing code for wireless communications at a first UE is described. The code may include instructions executable by a processor to receive, from a second UE, first information that indicates a tracking period and a data period that the first UE is to use for management of a set of configurable intelligent surfaces, adjust the set of configurable intelligent surfaces to a first configuration for a first communication between the second UE and a set of multiple network entities to occur during the tracking period, receive, from the second UE, signaling indicating a measurement report associated with the first communication occurring during the tracking period, and adjust, based on the measurement report, the set of configurable intelligent surfaces to a second configuration for a second communication between the second UE and a subset of network entities of the set of multiple network entities to occur during the data period.

In some examples of the method, apparatuses, and non-transitory computer-readable medium described herein, receiving the first information that indicates the tracking period and the data period may include operations, features, means, or instructions for receiving an indication of a timing offset, a periodicity, an expiration timer, or a combination thereof, that defines a pattern of the tracking period and the data period.

In some examples of the method, apparatuses, and non-transitory computer-readable medium described herein, receiving the second information indicating the measurement report may include operations, features, means, or instructions for receiving a request that the first UE perform an interference cancellation adjustment to the set of configurable intelligent surfaces, where the second configuration may be based on the request.

In some examples of the method, apparatuses, and non-transitory computer-readable medium described herein, receiving the second information indicating the measurement report may include operations, features, means, or instructions for receiving an indication of a signal metric that may be a received signal strength, a received signal quality, or both for each of the set of multiple network entities based on the communicating during the tracking period.

In some examples of the method, apparatuses, and non-transitory computer-readable medium described herein, the measurement report indicates the signal metric relative to a prior measurement of the signal metric for each of the set of multiple network entities.

Some examples of the method, apparatuses, and non-transitory computer-readable medium described herein may further include operations, features, means, or instructions for receiving, from the second UE, an indication of second measurement report associated with the communicating with the subset of the network entities during the data period.

In some examples of the method, apparatuses, and non-transitory computer-readable medium described herein, receiving the indication of the second measurement report may include operations, features, means, or instructions for receiving, from the second UE, an indication of a signal metric associated with data reception during the data period, where the signal metric may be received signal strength associated with the data reception during the data period, a received signal quality associated with the data reception during the data period, or both.

In some examples of the method, apparatuses, and non-transitory computer-readable medium described herein, the second measurement report indicates the signal metric relative to a prior measurement of the signal metric for the subset of network entities.

Some examples of the method, apparatuses, and non-transitory computer-readable medium described herein may further include operations, features, means, or instructions for receiving, from the second UE, signaling indicating distance information associated with one or more network entities of the set of multiple network entities relative to the second UE.

In some examples of the method, apparatuses, and non-transitory computer-readable medium described herein, the distance information indicates a zone identifier associated with each of the one or more network entities.

In some examples of the method, apparatuses, and non-transitory computer-readable medium described herein, the distance information indicates that each of the one or more network entities may be a primary network entity or a secondary network entity.

Some examples of the method, apparatuses, and non-transitory computer-readable medium described herein may further include operations, features, means, or instructions for transmitting, to the second UE, an indication of an increased interference for a period.

Some examples of the method, apparatuses, and non-transitory computer-readable medium described herein may further include operations, features, means, or instructions for determining, based on the measurement report, location information, sensor information, or a combination thereof, that the second UE may be entering a high interference region, where the indication of the increased interference may be transmitted based on determining that the second UE may be entering the high interference region.

In some examples of the method, apparatuses, and non-transitory computer-readable medium described herein, transmitting the indication of the increased interference may include operations, features, means, or instructions for transmitting an indication that the set of configurable intelligent surfaces may be unavailable for interference cancellation, signal boosting, or both, during the period.

In some examples of the method, apparatuses, and non-transitory computer-readable medium described herein, receiving the second information indicating the measurement report may include operations, features, means, or instructions for receiving the signaling over a sidelink channel with the second UE, where the sidelink channel may be a Bluetooth communication link, a Wi-fi link, a cellular sidelink, or a vehicle-to-everything communication link.

In some examples of the method, apparatuses, and non-transitory computer-readable medium described herein, adjusting the set of configurable intelligent surfaces to the first configuration may include operations, features, means, or instructions for adjusting the set of configurable intelligent surfaces to increase a signal metric associated with respective links between the second UE and each of the set of multiple network entities.

In some examples of the method, apparatuses, and non-transitory computer-readable medium described herein, adjusting the set of configurable intelligent surfaces to the second configuration may include operations, features, means, or instructions for adjusting the set of configurable intelligent surfaces to increase a signal metric associated with respective links between the second UE and one or more of the subset of network entities and to reduce the signal metric associated with respective links of other network entities of the set of multiple network entities.

In some examples of the method, apparatuses, and non-transitory computer-readable medium described herein, adjusting the set of configurable intelligent surfaces to the first configuration or to the second configuration may include operations, features, means, or instructions for adjusting an angle of transmission of one or more of the set of configurable intelligent surfaces, adjusting a mode of operation of one or more of the set of configurable intelligent surfaces between a reflective mode or a transmissive mode, or adjusting a phase of one or more of the set of configurable intelligent surfaces.

Some examples of the method, apparatuses, and non-transitory computer-readable medium described herein may further include operations, features, means, or instructions for determining the first configuration, the second configuration, or both based on a machine learning model that receives measurement reports as input.

Some examples of the method, apparatuses, and non-transitory computer-readable medium described herein may further include operations, features, means, or instructions for transmitting, to the second UE, an indication of one or more measurement occasions, where the measurement report includes measurements for the one or more measurement occasions.

In some examples of the method, apparatuses, and non-transitory computer-readable medium described herein, the one or more measurement occasions include at least one measurement occasion during the data period.

Some examples of the method, apparatuses, and non-transitory computer-readable medium described herein may further include operations, features, means, or instructions for determining the one or more measurement occasions based on the indication of the tracking period and the data period.

DETAILED DESCRIPTION

Figure 1:
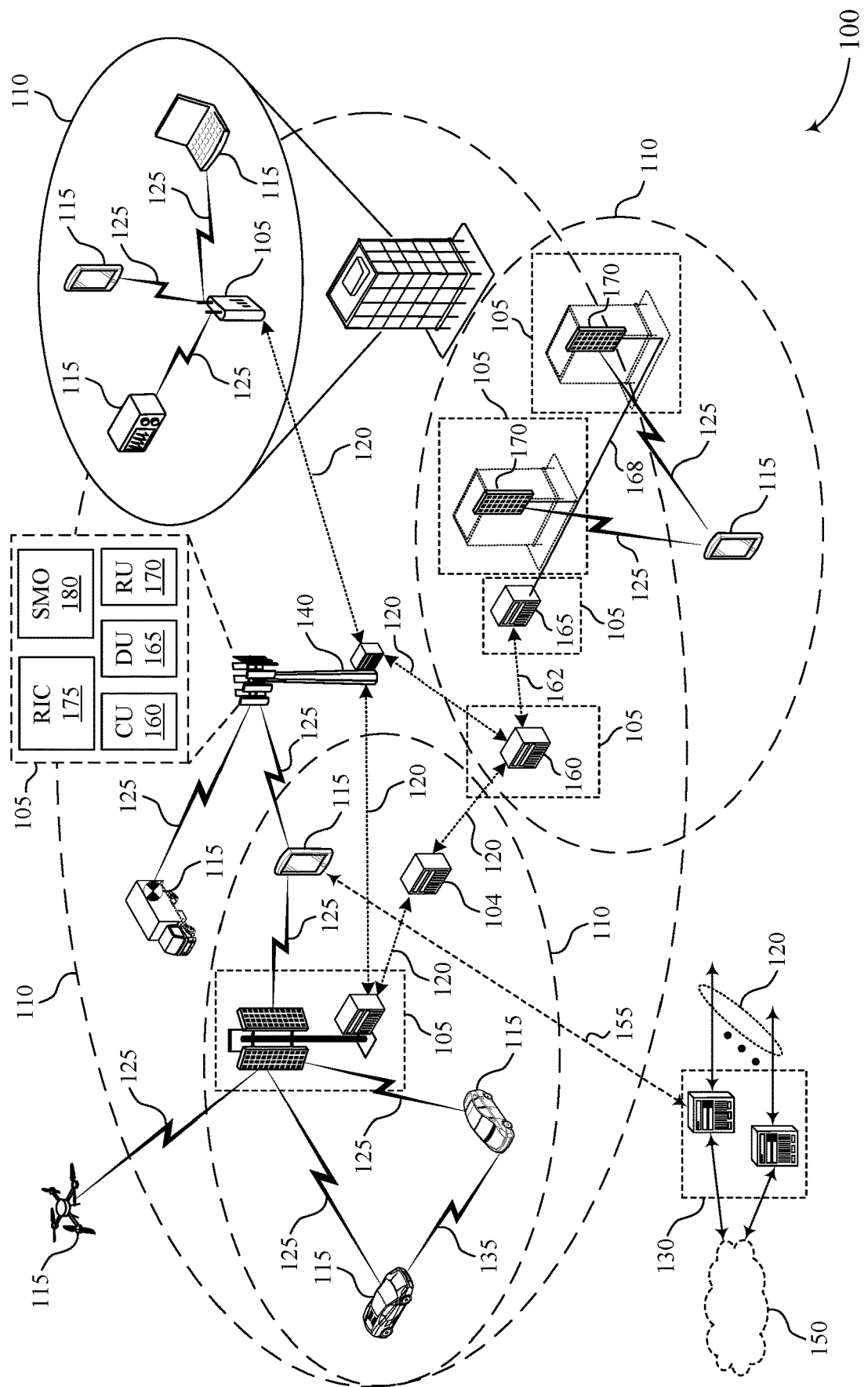
FIG. 1 illustrates an example of a wireless communications system that supports intelligent surface enabled techniques for interference management in accordance with one or more aspects of the present disclosure.

Wireless communication systems may support communications by network entities with user equipments (UEs) that are mobile, such as UEs in a vehicular environment (e.g., trains, cars, arial vehicles). However, communications with UEs that are moving (e.g., in vehicles) may suffer from outside to inside penetration loss, blocking, fading, and the like, which may result in failed or unreliable communications. Wireless communications systems may use configurable intelligent surfaces (e.g., reconfigurable intelligent surfaces (RISs)) to support or enhance communications. In some cases, the RISs may be positioned on vehicles, as the RISs may include electrically steerable meta materials and high transparency capabilities. As such, the RISs may be used in vehicle windows, windshields, sunroofs, or the like. In some examples, the RISs may use its electrical control capabilities to transmit or reflect an incident wave at a desired angle. However, the vehicular systems that control the RISs may not have access to data or networks to adequately support communication with UEs, as the control systems may not be capable of communications with the network.

In some implementations of the present disclosure, the wireless communication system may employ RISs to boost signal strength to the UEs and/or reflect signals away from the UEs inside a vehicle. For example, vehicles may include a vehicular UE (V-UE) communication device that controls RISs positioned at the vehicle based on communications with UEs positioned in the vehicle (e.g., handheld UEs (H-UEs)). To control the RISs, the V-UE may exchange control messages with the UEs in the vehicle (e.g., via side channel). In some examples, the H-UE may configure a tracking period and data period for the V-UE to use for management of the RISs. In the tracking period, the V-UE may configure the RISs to maximize signals from potential devices (e.g., network entities, UEs, or the like) for communication. That is, the V-UE may configure the RISs such that some are all signals are allowed to be received at the UEs in the vehicle. During the tracking period, the H-UE may measure received signals and transmit a measurement report to the V-UE that is based on the measurements of signals during the tracking period. During the data period, the V-UE may configure the RISs to boost one or more links (e.g., between the H-UEs and external network entities or UEs) and perform interference mitigation for the one or more links. The RIS configurations for link bosting and interference mitigation may be based on the measurement report. Additionally, the V-UE may change or refine the RISs configuration based on sensor information, artificial intelligence machine learning, maps, location information, or the like. Additionally, or alternatively, the V-UE may alert the H-UE of predictions of high interference zones to support throttling of data rates or notifications to the network entities.

Implementations of the subject matter described herein may be implemented to realize one or more of the following potential advantages. In some implementations, for example, one or more network entities may communicate with one or more UEs inside vehicles via the RISs. For vehicular use cases, the RISs may function as windows while also boosting or reflecting signals to the UEs. Techniques described herein may support MS control by using H-UEs (e.g., in vehicles) to measure signals and provide information to a UE that controls the RISs such that the RISs may be adjusted to support communications with the H-UEs.

Aspects of the disclosure are initially described in the context of wireless communications systems. Aspects of the disclosure are further described with respect to a wireless communications system illustrating communications between a UE and a network entity via RIS configurations, communication timelines for RIS control, and process flow diagrams. Aspects of the disclosure are further illustrated by and described with reference to apparatus diagrams, system diagrams, and flowcharts that relate to intelligent surface enabled techniques for interference management.

FIG. 1 illustrates an example of a wireless communications system 100 that supports intelligent surface enabled techniques for interference management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities based on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support intelligent surface enabled techniques for interference management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some aspects, the wireless communications system 100 may support communications between one or more network entities 105 and one or more UEs 115 via RISs, which may be used to redirect or block signals. In some cases, the RISs may be positioned on vehicles (e.g., as windows) such as to boost signal to UEs 115 within vehicles or reflect signals away from the UEs 115 in the vehicles. For example, the RISs may operate in a transmissive mode such as to perform anomalous transmissions and lensing to focus the energy in configurable directions. In vehicle implementations, the RISs transmissive mode may bend a wavefront to maximize energy at one or more points inside the vehicle. In other cases, the RISs may operate in a reflective mode to perform anomalous reflections of wavefronts in a configurable direction. Additionally, or alternatively, the reflective mode may include lensing capabilities. As such, the RISs may switch between transmissive and reflective modes by utilizing phase shifting of waves to either enhance or cancel signals for UEs 115 in vehicles.

In some examples, the wireless communication system 100 may include one or more V-UE communication devices that control the functionality and modes of the RISs. As described herein, the V-UE may control the RISs based on communication messages from the H-UEs (e.g., UEs 115) positioned in the vehicle to support communications between the H-UEs and external devices (e.g., network entities and other UEs). In some cases, vehicles may include multiple sensors (e.g., camera, radar, or the like) and the V-UE may use the sensor information for MS configuration and H-UE communication support. In some instances, the V-UE implementation may utilize artificial intelligence to support communication operations.

In some implementations, the wireless communications system 100 may support tracking and data periods to support communications via RIS control. For example, the first UE 115 may transmit to a second UE 115, which may be associated with (e.g., control or manage) a set of RISs, one or more signals indicating a tracking period and data period that the second UE may use for managing the set of RISs. The second UE 115 may configure the RISs to allow communication during the tracking period via the RISs between the first UE 115 and the one or more network entities 105. In some cases, the first UE 115 may transmit, to the second UE 115, the measurement report associated with the communication during the tracking period. The second UE 115 may adjust the RISs based on the received measurement report for communications during the data period. The first UE 115 may communicate via the RISs to the one or more network entities during the data period. Additional details relating to configurable intelligent surface enabled techniques for communication management are described herein.

Figure 2:
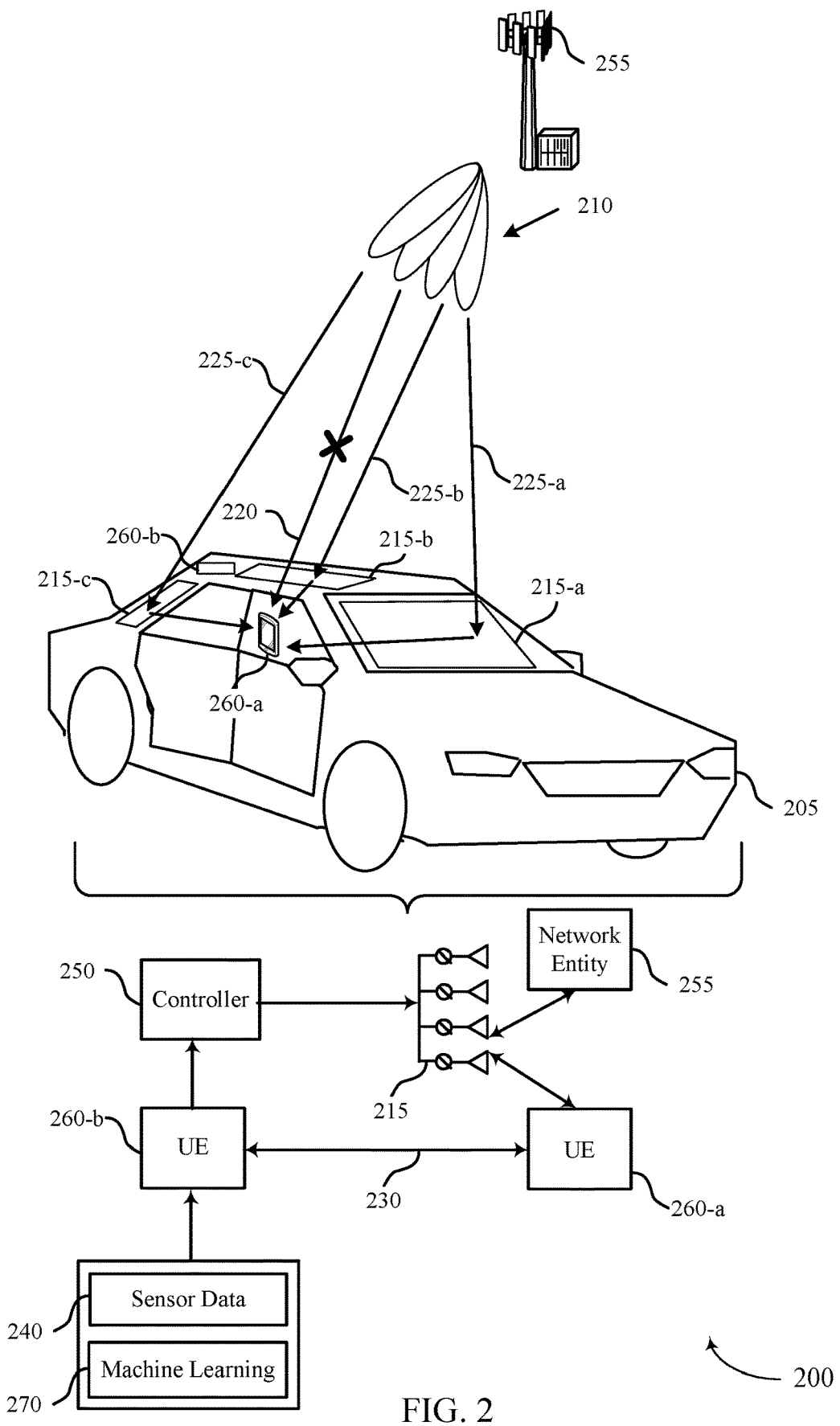
FIG. 2 illustrates an example of a wireless communications system that supports intelligent surface enabled techniques for interference management in accordance with one or more aspects of the present disclosure.

FIG. 2 illustrates an example of a wireless communications system 200 that supports intelligent surface enabled techniques for interference management in accordance with one or more aspects of the present disclosure. In some examples, wireless communications system 200 may implement aspects of wireless communication system 100. For example, wireless communications system 200 includes a UE 260-a and a network entity 255, which may be examples of the corresponding devices described with reference to FIG. 1.

In some aspects, wireless communications system 200 may suffer from outside to inside penetration loss, blocking, fading, and the like, between the network entities 255 and the UEs 260-a, which may be inside a vehicle 205. For example, the network entity 255 may transmit signals towards the UE 260-a in the vehicle 205 via beams 210 and a direct path 220. However, the one or more signals from the outside network entity 255 may fail to reach the inside UE 260-a due to various conditions, such as being blocked by components of the vehicle 205. As such, the vehicle 205 may be implemented with RISs 215 to support communications with the UE 260-a inside the vehicle 205. In some instances, the RISs 215 may be configured as electrically steerable meta-materials that may be used to may refract or reflect an incident wave at a desired angle to support such communications. As some RISs may be transparent, the RISs 215 may be installed on vehicles windows (e.g., the front windshields, the rear windshields, sun-roofs) to boost signal strength to the UE 260-a inside the vehicle 205 using the RIS 215. Using the RISs 215 may limit penetration losses for communications between the UE 260-a and the network entity 255.

As described herein, the RISs 215 may have multiple modes of operation, such as a transmissive mode and a reflective mode. In the transmissive mode, the RISs 215 may be configured to perform anomalous transmission and lensing. Anomalous transmission supports refraction, which may not follow Snell's law. For lensing, the RISs 215 may focus energy in limited directions. In the reflective mode, the RISs 215 may perform anomalous reflections to reflect a wavefront in a configurable direction. The RISs 215 may use lensing techniques in the reflective mode. The RISs 215 may be switched between transmissive and reflective modes, and a reflected/transmitted wave may be phase-shifted to enhance or cancel signals.

The H-UEs (e.g., UE 260-b) may track multiple network entities (e.g., network entity 255) to determine channel conditions and refine communications. For example, the UE 260-b may receive multiple synchronization signal blocks (SSBs) to decode system information. However, the UE 260-b may communicate data with one of the multiple network entities, such as network entity 255. In such cases, focusing the transmitted electromagnetic wave from other network entities may increase interference and degrade performance, and the RIS configuration may be configured for interference cancellation/shielding during communications with the network entity 255. Similarly, the UE 260-a may be receiving from multiple distributed neighboring sidelink UEs 115 (e.g., via mode 2 sidelink communications) and multiple sources of interference may occur. RIS control may be used to cancel interfering signals while boosting a desired sidelink signal. For example, the UE 260-a may perform both groupcast and unicast transmissions, and depending on data transmission schedule and priorities, the RIS may be controlled to perform intelligent interference cancellation.

In some implementations, the RISs 215 may be controlled (e.g., changed between transmissive and reflective modes) by control systems, which may be implemented by one or more UEs 260-b (e.g., one or more V-UEs). For example, a "shark-fin" antenna on top of a vehicle may be an example of a V-UE (including associated hardware/firmware) that may control the RISs. Further, these V-UE control systems may access or use data from multiple sensors (e.g., camera, radar) for tracking and planning for RIS control. Additionally, these V-UEs may use artificial intelligence and machine learning capabilities to support such techniques.

However, the UEs 260-b may be out-of-band (OOB) with network entities (e.g., network entity 255) and/or other UEs, such as UE 260-a. For example, the UEs 260-b may not be able to communicate with the network entities 255 due to the UE 260-b being a non-cellular UE or being limited to Wi-Fi or dedicated short range communication (DSRC) for vehicle to everything (V2X) communication. In some other examples, communications between the UE 260-*b* and the UE 260-*a* may fail due to the UE 260-*b* having sub-6 capabilities while the UEs 260-*a* is in frequency range 2 (FR2). As such, communication between the network entity 255 and the UE 260-*b* to support control of the RISs 215 may be limited or inhibited. However, communications between the UE 260-*a* and the UE 260-*b* may be supported by side channel, such as via unlicensed spectrum (e.g., Wi-Fi, Bluetooth, or the like) or via sidelink cellular channel.

In some cases, the UE 260-*b* may use a side channel 230 to indicate various capability information. For example, the UE 260-*b* may indicate that the UE 260-*b* controls one or more signal assisting devices (e.g., the RISs 215, a repeater) and the frequency bands where the specified signal assisting devices may operate. Additionally, or alternatively, the UE 260-*b* may indicate that the UE 260-*b* may have various sensors that provide sensor data 240 and machine learning capabilities via capability signaling. The capability signaling may be transmitted between the UE 260-*a* and the UE 260-*b* based on a connection, such as via a Bluetooth connection between UEs 115 inside a vehicle (e.g., UE 260-*a*) and the V-UE (e.g., UE 260-*b*) that controls the RISs (e.g., RIS 215). The capability signaling by UE 260-*b* may occur during connection establishment or may be sent periodically.

Techniques described herein are proposed to leverage the use of H-UEs (e.g., UE 260-*a*) to support V-UEs (e.g., UE 260-*b*) in the control of configurable intelligent surfaces (e.g., RISs 215) on a vehicle for enhanced communications between external devices (e.g., other UEs and network entities, such as network entity 255) and the H-UES that are positioned inside the vehicle. For example, the OOB UE 260-*b* may aid the in-vehicle UE 260-*a* in communications with the network entity 255. To support such communications, the UE 260-*b* may be configured with a tracking period and a data period. During the tracking period, the UE 260-*b* may control the RIS 215 such that signals to and from external devices is maximized. That is, the RIS 215 may be configured to allow communications between multiple external devices and the UE 260-*a*. During the tracking period, the UE 260-*a* may perform measurements of signals received from the external devices, and indicate to the UE 260-*b* the results of such measurements. During the data period, the UE 260-*b* may control or adjust the RISs 215 (e.g., a subset of the RISs 215) to perform link boosting and/or interference mitigation. The RISs 215 configuration during the data period may be based on the measurement reports associated with measurements that were performed by the UE 260-*a* during the data period. Additionally, the RISs 215 may be controlled based on other sensor data, as well as machine learning and/or AI systems. As such, these techniques may support enhanced coverage and improved in-vehicle user experience.

For example, to support communications between the network entity 255 and the UE 260-*a* via a path 225, the UE 260-*b* may configure the RIS 215 based on information received from the UE 260-*a*. In some cases, the UE 260-*b* may communicate with the UE 260-*a* via the side channel 230, which may be an example of a Bluetooth communication link, a Wi-fi link, a cellular sidelink (e.g., PC5 interface), or a V2X communication link. Using the side channel 230, the UE 260-*a* may configure the UE 260-*b* with a tracking period and a data period, as described herein. The UE 260-*b* may control the RISs 215 via a controller 250 based on the configuration of the tracking period and the data period. The UE 260-*b* may also use sensor data 240, which may include GPS data, camera data, radar data, or the like, to support RIS configuration during the tracking and/or data periods. Additionally, or alternatively, the UE 115-*b* may use a machine learning system 270 (and/or an artificial intelligence (AI) system) to support the RIS configuration during the tracking and/or data periods.

Figure 3A:
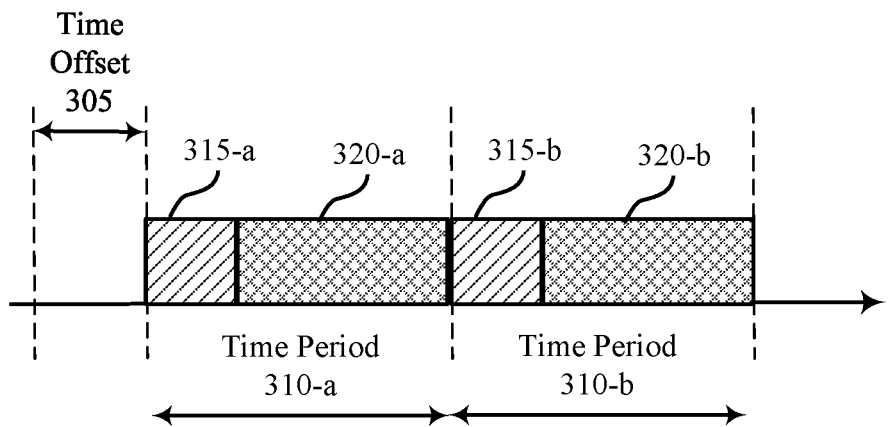
FIG. 3A and FIG. 3B illustrate examples of communication timelines that support intelligent surface enabled techniques for interference management in accordance with one or more aspects of the present disclosure.
Figure 3B:
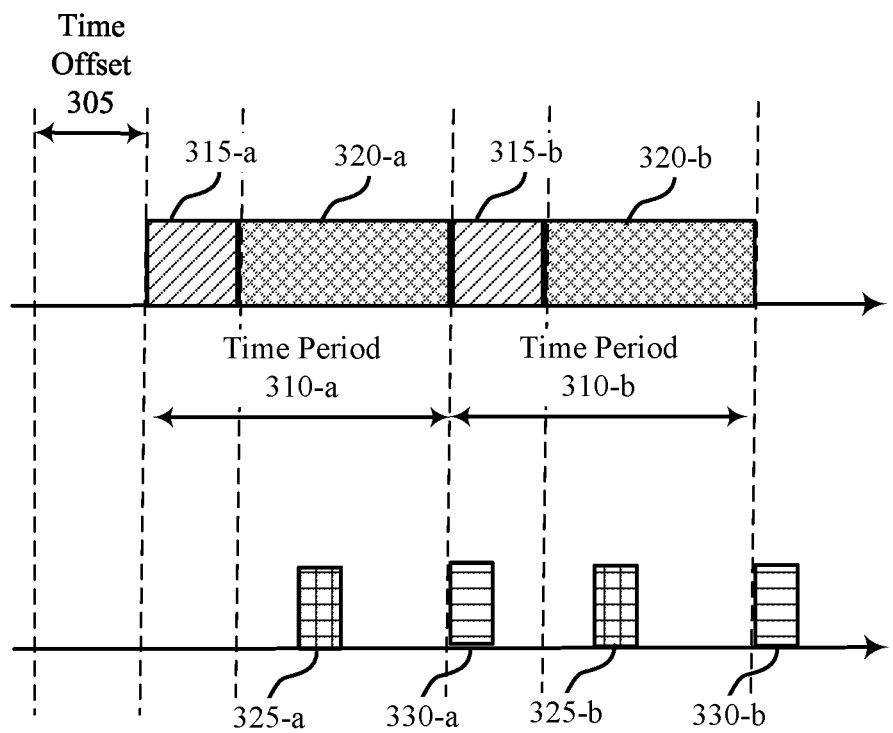

FIG. 3A and FIG. 3B illustrate examples of communication timelines 300 that support intelligent surface enabled techniques for interference management in accordance with one or more aspects of the present disclosure. In some examples, the communication timelines 300 may be implemented by aspects of wireless communication system 100 or 200. For example, the communication timelines 300 may be used by a H-UE (e.g., UE 260-*a* of FIG. 2) and a V-UE (e.g., UE 260-*b* of FIG. 2) to support communications between an external devices (e.g., network entities) and the H-UE. That is, the communication timelines 300 may be used to support RIS configurations by the V-UE for communications between the H-UE and the external devices. For example, the RISs may be configured to focus transmissions (e.g., synchronization signal bursts) from many trackable network entities during a tracking period 315 and configured to perform interference cancellation and shielding during a data period. As such, the H-UE and the V-UE may use one or more tracking periods 315 and one or more data periods 320 to switch various RISs (e.g., RISs 215 of FIG. 2) between transmissive and interference-cancellation modes. As described herein, the V-UE may control the RISs based on sensor information or artificial intelligence (AI) or machine learning techniques to determine the one or more RISs configurations to boost or cancel signals.

In some examples, the H-UE may notify the V-UE of a time domain duplex (TDD) pattern via a side channel. In some cases, the TDD pattern may allocate a time window into the tracking periods 315 and the data periods 320. In one example, the TDD pattern may include a timing offset 305. Additionally, or alternatively, the TDD pattern may be allocated based on a periodicity or a time period 310. In some cases, the TDD pattern may include an expiry timer. Thus, the TDD pattern of tracking periods 315 and data periods 320 may be configured by the H-UE using a timing offset, periodicity, expiration timer, or a combination thereof. In some examples, the H-UE may indicate or request that the V-UE perform interference cancellation via the RISs. In some cases, the H-UE may determine interference cancellation configurations for the RISs based on H-UE measurements across multiple tracked network entities or transmissions. For example, during the tracking period 315, the H-UE may determine that a secondary cell reference signal received power (RSRP) is within a delta (e.g., threshold) or measurement range in decibels (dB) of the primary cell RSRP. In some examples, the H-UE may determine that the V-UE is to control interference cancellation through the RISs based on interference measurements during data reception. Thus, based on measurements and communications by the H-UE, the H-UE may indicate that the V-UE is to perform interference cancellation via RIS adjustment.

In some examples, the H-UE may provide the V-UE with distance or location information for the one or more network entities (e.g., network entities 105 of FIG. 1 and FIG. 2). For example, the distance information may indicate an existence multiple network entities around the current location. Additionally, for sidelink implementations, the H-UE may provide zone identification (Zone-ID) based information of other devices (e.g., other UEs) to be tracked. In some examples, indications associated with location information may indicate whether the network entities are a primary or secondary transmitter (e.g., corresponding to a primary cell or secondary cell). Additionally, or alternatively, the indication of the primary or secondary transmitter may be configured on a per data occasion basis. For example, for a sidelink UE, the first data occasion may be used for unicast communication with a first UE, and the H-UE may indicate to the V-UE that the first UE is primary. In other cases, the H-UE may indicate that a second UE is primary and that the first UE is secondary and used for measurement purposes.

Upon receiving the indication of the TDD patterns and or interference cancellation requests, the V-UE may determine RIS configurations corresponding to communication paths for signal boosting and/or interference cancellation. In some examples, the V-UE may use sensor information (e.g., perception), an AI/ML sub-system, or both, for determining MS configurations. In some cases, the V-UE may autonomously track and configure the RISs to perform link boosting and interference cancellations. For example, the V-UE adjust the RIS configurations such that links are boosted for multiple network entities in the tracking periods 315. Additionally, the V-UE adjust the RISs such that a primary link is boosted and a secondary link (e.g., interfering links) may be canceled during the data periods 320.

As indicated in FIG. 3B, the H-UE may perform measurements during measurement occasions 325 and 330. In some examples, the H-UE is configured with the measurement occasions by the H-UE. As illustrated, the measurement occasions may overlap with tracking periods 315 and/or data periods 320. Thus, during data period 320-a, the H-UE may measure received signals during measurement occasion 325-a, and the measured signals may be boosted and/or canceled by the configuration of the RISs as controlled by the V-UE. During the tracking period 315-b, the H-UE may measure received signals during the measurement occasion 330-a. Thus, measurement reports transmitted by the H-UE to the V-UE may be associated with the tracking period, the data period, or both. In some examples, the V-UE may determine the measurement occasions 325 and 330 based on the configured pattern of tracking periods 315 and data periods 320. In some examples, a single measurement occasion 325 may be configured per data period 320 and a single measurement occasion 330 may be configured per tracking period 315. Additionally, or alternatively, multiple measurement occasions may be configured per tracking period 315 and/or data period 320.

In some cases, the contents of a measurement report may be dependent on whether the measurement report corresponds to a tracking period 315 or a data period 320. For example, for a measurement report corresponding to a tracking period 315, the contents may include a metric for a signal strength (e.g., RSRP) and/or signal quality (a reference signal received quality (RSRQ)) for each of the network entities. In some examples, the measurement report may indicate whether the signal strength has improved or degraded compared to a previous measurement. In some instances, the indication for signal strength may include a value of an improvement or degradation (e.g., 3 dB down from the previous measurement) relative to a previous measurement. In some cases, the contents of the measurement report for the data periods 320 may include a signal strength associated with the data reception (e.g., RSRP measured for a demodulation reference signal (DMRS)), a signal quality (e.g., RSRQ) associated with the data reception, and/or an indication of improvement or degradation of the signal.

In some cases, the V-UE may receive the measurement report and change or refine one or more RIS configurations. The RIS configuration may be adjusted by adjusting the angle of transmission of the RIS, a adjusting the mode of operation of the RIS (e.g., transmissive to reflective mode, reflective to transmissive mode), or adjusting the phase of the RIS elements. In some examples, the V-UE may use sensor data and AI or machine learning techniques, in addition to the measurement reports, to change or refine the RIS configurations for signal boosting and/or interference cancellation.

Additionally, the V-UE may use maps and location information (e.g., GPS data), in addition to measurement reports, to determine that the vehicle is approaching a high interference region. For example, the interference region may include a location where signals from multiple transmitters may be transmitted with high power. In other examples, the interference region may include an area where transmissions from both the primary and secondary transmitters are blocked or shadowed, which may result in a low signal-to-noise ratio (SINR). As such, the V-UE may signal the H-UE of the interference event over the side channel and/or future time periods when high interference may occur. In some examples, the V-UE may additionally send an indication that RIS based interference cancellation or RIS based signals boosting may not be feasible during time periods, such as the data periods 320.

In some aspects, the H-UE may respond to the indication of the interference region by throttling the data rate during the indicated time periods. In some examples, the H-UE may notify a network entity (e.g., a primary network entity) of a future conflict prediction via radio resource control (RRC) signaling, or another type of control signaling. In response to being notified, the network entity may throttle the downlink data rate and/or shift to a lower modulation control scheme (MCS) transmission. In some cases, the proactive shift of transmissions may save time for link change adaptation.

Figure 4:
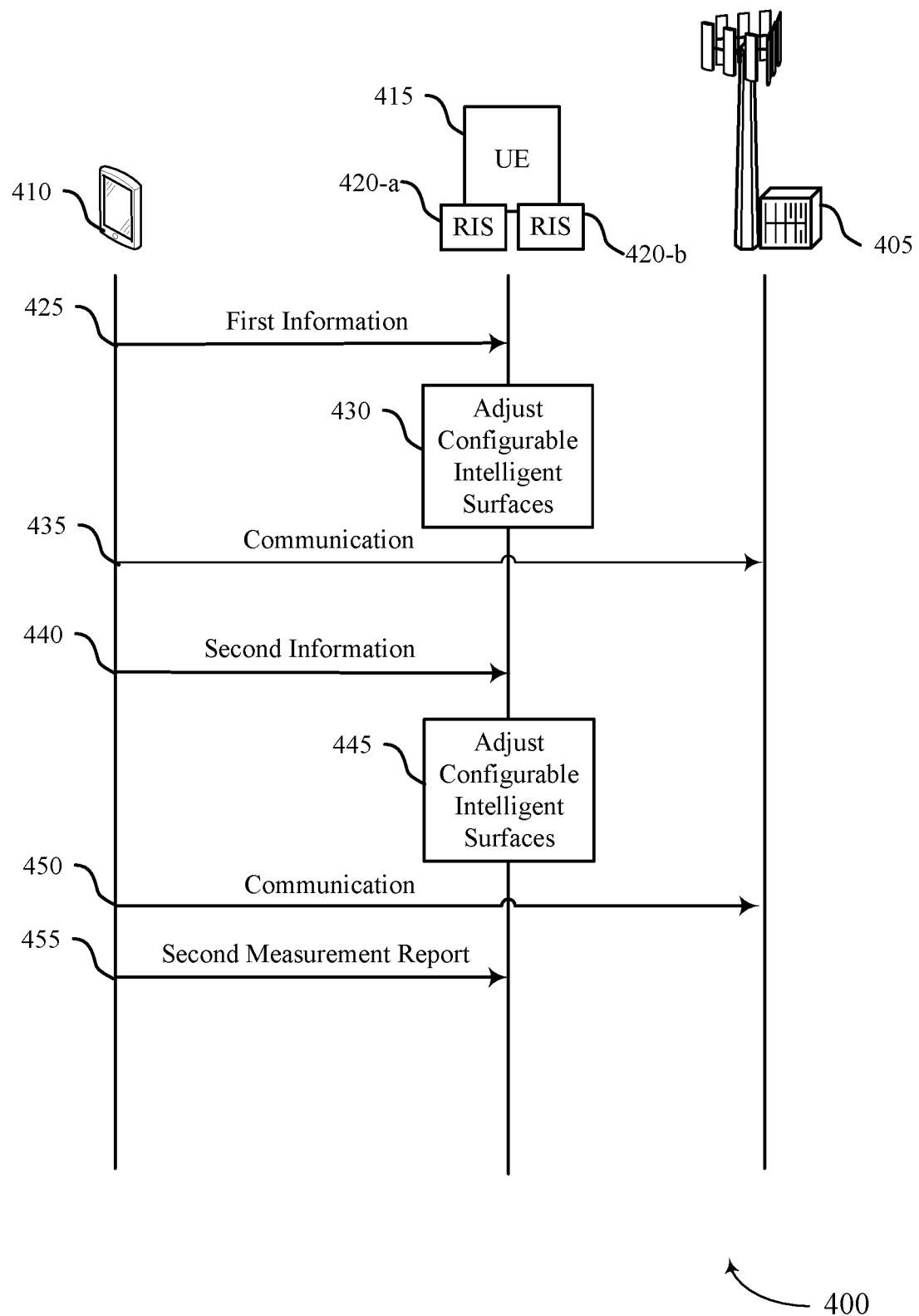
FIG. 4 illustrates an example of a process flow that supports intelligent surface enabled techniques for interference management in accordance with one or more aspects of the present disclosure.

FIG. 4 illustrates an example of a process flow 400 that supports intelligent surface enabled techniques for interference management in accordance with one or more aspects of the present disclosure. In some examples, the process flow 400 may be implemented by aspects of wireless communication system 100 and 200 of FIGS. 1 and 2 and may use the communication timelines 300 of FIG. 3A and FIG. 3B. The process flow 400 includes a UE 410 (e.g., an H-UE) and a UE 415 (e.g., a V-UE), which may be examples of corresponding devices as described with respect to FIGS. 1 through 3. The process flow 400 also includes a network entity 405, which may be an example of a network entity as described with respect to FIGS. 1 through 3. The second UE may be associated with (e.g., manage) a set of configurable intelligent surfaces (e.g., RISs 420).

At 425, the UE 410 (e.g., a first UE) may transmit, to the UE 415 (e.g., a second UE), first information that indicates a tracking period and a data period that the UE 415 is to use for management of the set of configurable intelligent surfaces (e.g., RISs 420). In some examples, the first information may include an indication of a timing offset, a periodicity, an expiration timer, or a combination thereof, that defines a pattern of the tracking period and the data period.

At 430, the UE 415 may adjust the set of configurable intelligent surfaces to a first configuration for a first communication between the UE 410 and a plurality of network entities to occur during the tracking period. In some examples, adjusting the set of configurable intelligent surfaces may include adjusting the set of configurable intelligent surfaces to increase a signal metric associated with respective links between the second UE and each of the plurality of network entities. Adjusting may include adjusting an angle of transmission of one or more of the set of configurable intelligent surfaces, adjusting a mode of operation of one or more of the set of configurable intelligent surfaces between a reflective mode or a transmissive mode, adjusting a phase of one or more of the set of configurable intelligent surfaces, or any combination thereof.

At 435, the UE 410 may communicate, via the set of configurable intelligent surfaces, with a plurality of network entities (e.g., including the network entity 405) during the tracking period. In some examples, the UE 410 may perform measurements of signals received from one or more of the plurality of network entities during one or more measurement occasions during the tracking period.

At 440, the UE 410 may transmit, to the UE 415, second information indicating a measurement report associated with the communicating during the tracking period. In some examples, transmission of the second information may include transmitting a request that the UE 415 perform an interference cancellation adjustment to the set of configurable intelligent surfaces. The measurement report may be transmitted based on determining that a secondary cell is within a threshold receive power of a primary cell receive power. The measurement report may include indications of a signal metric that is a received signal strength, a received signal quality, or both for each of the plurality of network entities based at least in part on the communicating during the tracking period.

At 445, the UE 415 may adjust, based at least in part on the measurement report, the set of configurable intelligent surfaces to a second configuration for a second communication between the UE 410 and a subset of network entities of the plurality of network entities to occur during the data period. The adjusting may include adjusting the set of configurable intelligent surfaces to increase a signal metric (e.g., boost the signal) associated with respective links between the second UE and one or more of the subset of network entities and to reduce the signal metric (e.g., reduce or cancel interference) associated with respective links of other network entities of the plurality of network entities. The adjusting may include adjusting an angle of transmission of one or more of the set of configurable intelligent surfaces, adjusting a mode of operation of one or more of the set of configurable intelligent surfaces between a reflective mode or a transmissive mode, adjusting a phase of one or more of the set of configurable intelligent surfaces, or any combination thereof.

At 450, the UE 415 may communicate via the set of configurable intelligent surfaces and based at least in part on the measurement report, with a subset of network entities (e.g., including the network entity 405) of the plurality of network entities during the data period. In some examples, the UE 410 may perform measurements of signals received from one or more of the plurality of network entities during one or more measurement occasions during the data period.

At 455, the UE 410 may transmit, to the UE 415, an indication of a second measurement report associated with the communicating with the subset of the network entities during the data period. The UE 415 may use the second measurement report to further refine the second configuration of the RISs to support the communications between the UE 410 and the one or more network entities.

Figure 5:
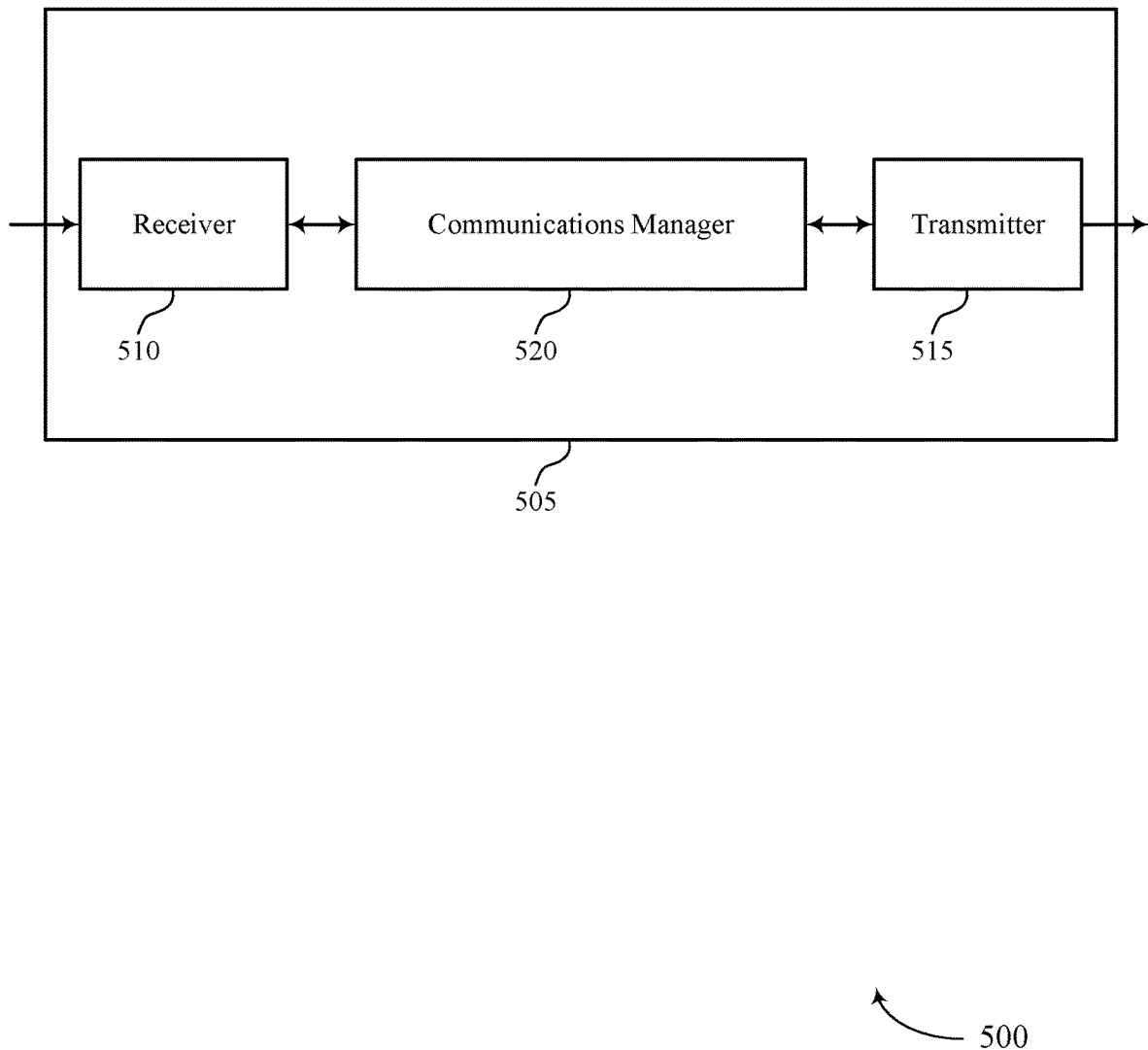
FIGS. 5 and 6 show block diagrams of devices that support intelligent surface enabled techniques for interference management in accordance with one or more aspects of the present disclosure.

FIG. 5 shows a block diagram 500 of a device 505 that supports intelligent surface enabled techniques for interference management in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to intelligent surface enabled techniques for interference management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to intelligent surface enabled techniques for interference management). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of intelligent surface enabled techniques for interference management as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first UE in accordance with examples as disclosed herein. For example, the communications manager 520 may be configured as or otherwise support a means for transmitting, to a second UE associated with a set of configurable intelligent surfaces, first information that indicates a tracking period and a data period that the second UE is to use for management of the set of configurable intelligent surfaces. The communications manager 520 may be configured as or otherwise support a means for communicating, via the set of configurable intelligent surfaces, with a set of multiple network entities during the tracking period. The communications manager 520 may be configured as or otherwise support a means for transmitting, to the second UE, second information indicating a measurement report associated with the communicating during the tracking period. The communications manager 520 may be configured as or otherwise support a means for communicating, via the set of configurable intelligent surfaces and based on the measurement report, with a subset of network entities of the set of multiple network entities during the data period.

Additionally, or alternatively, the communications manager 520 may support wireless communications at a first UE in accordance with examples as disclosed herein. For example, the communications manager 520 may be configured as or otherwise support a means for receiving, from a second UE, first information that indicates a tracking period and a data period that the first UE is to use for management of a set of configurable intelligent surfaces. The communications manager 520 may be configured as or otherwise support a means for adjusting the set of configurable intelligent surfaces to a first configuration for a first communication between the second UE and a set of multiple network entities to occur during the tracking period. The communications manager 520 may be configured as or otherwise support a means for receiving, from the second UE, signaling indicating a measurement report associated with the first communication occurring during the tracking period. The communications manager 520 may be configured as or otherwise support a means for adjusting, based on the measurement report, the set of configurable intelligent surfaces to a second configuration for a second communication between the second UE and a subset of network entities of the set of multiple network entities to occur during the data period.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing due to reduced interference and retransmission as a result. For example, by using UEs to control configurable intelligent surfaces to support communications between a UE and a network entity, interference may be reduced and communications may be more reliable and efficient.

Figure 6:
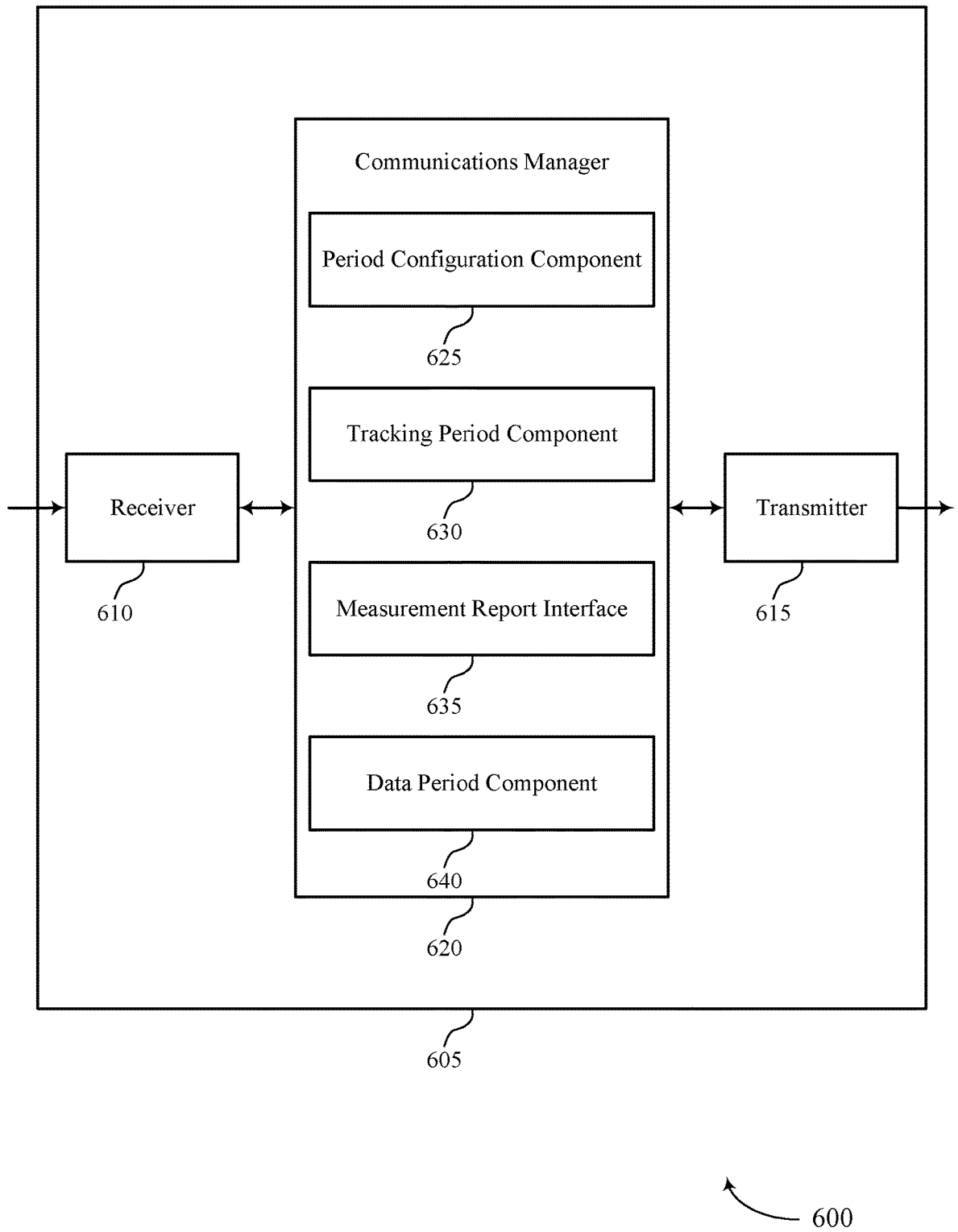

FIG. 6 shows a block diagram 600 of a device 605 that supports intelligent surface enabled techniques for interference management in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to intelligent surface enabled techniques for interference management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to intelligent surface enabled techniques for interference management). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of intelligent surface enabled techniques for interference management as described herein. For example, the communications manager 620 may include a period configuration component 625, a tracking period component 630, a measurement report interface 635, a data period component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. The period configuration component 625 may be configured as or otherwise support a means for transmitting, to a second UE associated with a set of configurable intelligent surfaces, first information that indicates a tracking period and a data period that the second UE is to use for management of the set of configurable intelligent surfaces. The tracking period component 630 may be configured as or otherwise support a means for communicating, via the set of configurable intelligent surfaces, with a set of multiple network entities during the tracking period. The measurement report interface 635 may be configured as or otherwise support a means for transmitting, to the second UE, second information indicating a measurement report associated with the communicating during the tracking period. The data period component 640 may be configured as or otherwise support a means for communicating, via the set of configurable intelligent surfaces and based on the measurement report, with a subset of network entities of the set of multiple network entities during the data period.

Additionally, or alternatively, the communications manager 620 may support wireless communications at a first UE in accordance with examples as disclosed herein. The period configuration component 625 may be configured as or otherwise support a means for receiving, from a second UE, first information that indicates a tracking period and a data period that the first UE is to use for management of a set of configurable intelligent surfaces. The tracking period component 630 may be configured as or otherwise support a means for adjusting the set of configurable intelligent surfaces to a first configuration for a first communication between the second UE and a set of multiple network entities to occur during the tracking period. The measurement report interface 635 may be configured as or otherwise support a means for receiving, from the second UE, signaling indicating a measurement report associated with the first communication occurring during the tracking period. The data period component 640 may be configured as or otherwise support a means for adjusting, based on the measurement report, the set of configurable intelligent surfaces to a second configuration for a second communication between the second UE and a subset of network entities of the set of multiple network entities to occur during the data period.

Figure 7:
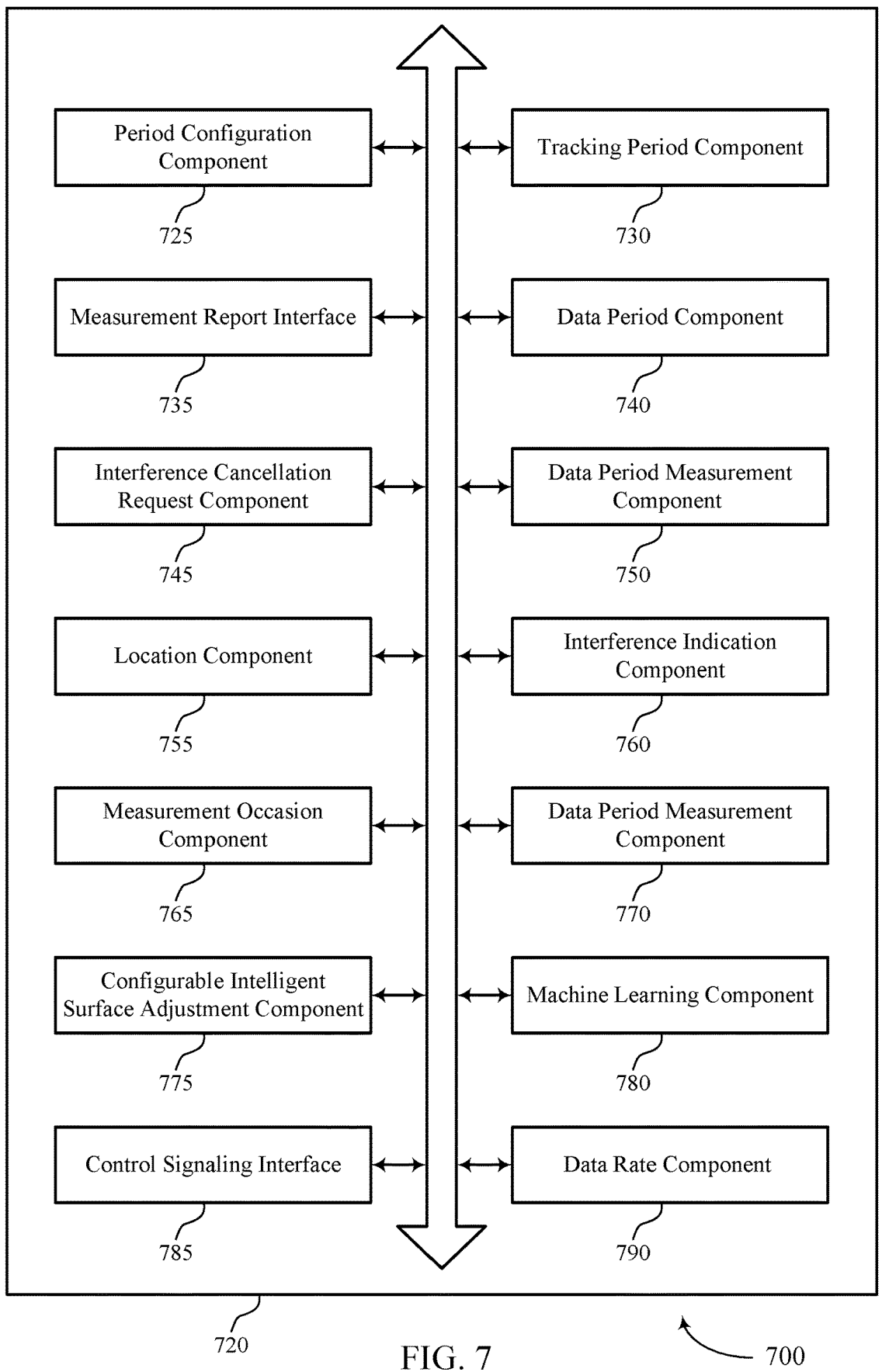
FIG. 7 shows a block diagram of a communications manager that supports intelligent surface enabled techniques for interference management in accordance with one or more aspects of the present disclosure.

FIG. 7 shows a block diagram 700 of a communications manager 720 that supports intelligent surface enabled techniques for interference management in accordance with one or more aspects of the present disclosure. The communications manager 720 may be an example of aspects of a communications manager 520, a communications manager 620, or both, as described herein. The communications manager 720, or various components thereof, may be an example of means for performing various aspects of intelligent surface enabled techniques for interference management as described herein. For example, the communications manager 720 may include a period configuration component 725, a tracking period component 730, a measurement report interface 735, a data period component 740, an interference cancellation request component 745, a data period measurement component 750, a location component 755, an interference indication component 760, a measurement occasion component 765, a data period measurement component 770, a configurable intelligent surface adjustment component 775, a machine learning component 780, a control signaling interface 785, a data rate component 790, or any combination thereof. Each of these components may communicate, directly or indirectly, with one another (e.g., via one or more buses).

The communications manager 720 may support wireless communications at a first UE in accordance with examples as disclosed herein. The period configuration component 725 may be configured as or otherwise support a means for transmitting, to a second UE associated with a set of configurable intelligent surfaces, first information that indicates a tracking period and a data period that the second UE is to use for management of the set of configurable intelligent surfaces. The tracking period component 730 may be configured as or otherwise support a means for communicating, via the set of configurable intelligent surfaces, with a set of multiple network entities during the tracking period. The measurement report interface 735 may be configured as or otherwise support a means for transmitting, to the second UE, second information indicating a measurement report associated with the communicating during the tracking period. The data period component 740 may be configured as or otherwise support a means for communicating, via the set of configurable intelligent surfaces and based on the measurement report, with a subset of network entities of the set of multiple network entities during the data period.

In some examples, to support transmitting the first information that indicates the tracking period and the data period, the period configuration component 725 may be configured as or otherwise support a means for transmitting an indication of a timing offset, a periodicity, an expiration timer, or a combination thereof, that defines a pattern of the tracking period and the data period.

In some examples, to support transmitting the second information indicating the measurement report, the interference cancellation request component 745 may be configured as or otherwise support a means for transmitting, to the second UE, a request that the second UE perform an interference cancellation adjustment to the set of configurable intelligent surfaces.

In some examples, to support transmitting the second information indicating the measurement report, the measurement report interface 735 may be configured as or otherwise support a means for transmitting signaling indicating the measurement report based on determining that a secondary cell is within a threshold receive power of a primary cell receive power.

In some examples, to support transmitting the second information indicating the measurement report, the measurement report interface 735 may be configured as or otherwise support a means for transmitting an indication of a signal metric that is a received signal strength, a received signal quality, or both for each of the set of multiple network entities based on the communicating during the tracking period.

In some examples, the measurement report indicates the signal metric relative to a prior measurement of the signal metric for each of the set of multiple network entities.

In some examples, the data period measurement component 750 may be configured as or otherwise support a means for transmitting, to the second UE, an indication of second measurement report associated with the communicating with the subset of the network entities during the data period.

In some examples, to support transmitting the second information indicating the measurement report, the data period measurement component 750 may be configured as or otherwise support a means for transmitting an indication of a signal metric associated with data reception during the data period, where the signal metric is received signal strength associated with the data reception during the data period, a received signal quality associated with data reception during the data period, or both.

In some examples, the second measurement report indicates the signal metric relative to a prior measurement of the signal metric for the subset of network entities.

In some examples, the location component 755 may be configured as or otherwise support a means for transmitting, to the second UE, location information associated with one or more network entities of the set of multiple network entities relative to the first UE.

In some examples, the location information indicates a distance metric or a zone identifier associated with each of the one or more network entities.

In some examples, the location information indicates that each of the one or more network entities is a primary network entity or a secondary network entity.

In some examples, each of the one or more network entities is indicated as the primary network entity or the second network entity on a data occasion basis.

In some examples, the interference indication component 760 may be configured as or otherwise support a means for receiving, from the second UE, an indication of an increased interference for a period.

In some examples, the control signaling interface 785 may be configured as or otherwise support a means for transmitting, to a base station based on receiving the indication of increased interference, control signaling including an indication of the increased interference for the period.

In some examples, the data rate component 790 may be configured as or otherwise support a means for reducing a data rate for communications during the period.

In some examples, to support transmitting the second information indicating measurement report, the measurement report interface 735 may be configured as or otherwise support a means for transmitting the second information over a side channel with the second UE, where the side channel is a Bluetooth communication link, a Wi-fi link, a cellular sidelink, or a vehicle-to-everything communication link.

In some examples, the measurement occasion component 765 may be configured as or otherwise support a means for receiving, from the second UE, an indication of one or more measurement occasions, where the measurement report includes measurements for the one or more measurement occasions.

In some examples, the one or more measurement occasions include at least one measurement occasion during the data period.

Additionally, or alternatively, the communications manager 720 may support wireless communications at a first UE in accordance with examples as disclosed herein. In some examples, the period configuration component 725 may be configured as or otherwise support a means for receiving, from a second UE, first information that indicates a tracking period and a data period that the first UE is to use for management of a set of configurable intelligent surfaces. In some examples, the tracking period component 730 may be configured as or otherwise support a means for adjusting the set of configurable intelligent surfaces to a first configuration for a first communication between the second UE and a set of multiple network entities to occur during the tracking period. In some examples, the measurement report interface 735 may be configured as or otherwise support a means for receiving, from the second UE, signaling indicating a measurement report associated with the first communication occurring during the tracking period. In some examples, the data period component 740 may be configured as or otherwise support a means for adjusting, based on the measurement report, the set of configurable intelligent surfaces to a second configuration for a second communication between the second UE and a subset of network entities of the set of multiple network entities to occur during the data period.

In some examples, to support receiving the first information that indicates the tracking period and the data period, the period configuration component 725 may be configured as or otherwise support a means for receiving an indication of a timing offset, a periodicity, an expiration timer, or a combination thereof, that defines a pattern of the tracking period and the data period.

In some examples, to support receiving the second information indicating the measurement report, the interference cancellation request component 745 may be configured as or otherwise support a means for receiving a request that the first UE perform an interference cancellation adjustment to the set of configurable intelligent surfaces, where the second configuration is based on the request.

In some examples, to support receiving the second information indicating the measurement report, the measurement report interface 735 may be configured as or otherwise support a means for receiving an indication of a signal metric that is a received signal strength, a received signal quality, or both for each of the set of multiple network entities based on the communicating during the tracking period.

In some examples, the measurement report indicates the signal metric relative to a prior measurement of the signal metric for each of the set of multiple network entities.

In some examples, the data period measurement component 770 may be configured as or otherwise support a means for receiving, from the second UE, an indication of second measurement report associated with the communicating with the subset of the network entities during the data period.

In some examples, to support receiving the indication of the second measurement report, the data period measurement component 770 may be configured as or otherwise support a means for receiving, from the second UE, an indication of a signal metric associated with data reception during the data period, where the signal metric is received signal strength associated with the data reception during the data period, a received signal quality associated with the data reception during the data period, or both.

In some examples, the second measurement report indicates the signal metric relative to a prior measurement of the signal metric for the subset of network entities.

In some examples, the location component 755 may be configured as or otherwise support a means for receiving, from the second UE, signaling indicating location information associated with one or more network entities of the set of multiple network entities relative to the second UE.

In some examples, the location information indicates a distance metric or a zone identifier associated with each of the one or more network entities.

In some examples, the location information indicates that each of the one or more network entities is a primary network entity or a secondary network entity.

In some examples, the interference indication component 760 may be configured as or otherwise support a means for transmitting, to the second UE, an indication of an increased interference for a period.

In some examples, the interference indication component 760 may be configured as or otherwise support a means for determining, based on the measurement report, location information, sensor information, or a combination thereof, that the second UE is entering a high interference region, where the indication of the increased interference is transmitted based on determining that the second UE is entering the high interference region.

In some examples, to support transmitting the indication of the increased interference, the interference indication component 760 may be configured as or otherwise support a means for transmitting an indication that the set of configurable intelligent surfaces are unavailable for interference cancellation, signal boosting, or both, during the period.

In some examples, to support receiving the second information indicating the measurement report, the measurement report interface 735 may be configured as or otherwise support a means for receiving the signaling over a side channel with the second UE, where the side channel is a Bluetooth communication link, a Wi-fi link, a cellular sidelink, or a vehicle-to-everything communication link.

In some examples, to support adjusting the set of configurable intelligent surfaces to the first configuration, the configurable intelligent surface adjustment component 775 may be configured as or otherwise support a means for adjusting the set of configurable intelligent surfaces to increase a signal metric associated with respective links between the second UE and each of the set of multiple network entities.

In some examples, to support adjusting the set of configurable intelligent surfaces to the second configuration, the configurable intelligent surface adjustment component 775 may be configured as or otherwise support a means for adjusting the set of configurable intelligent surfaces to increase a signal metric associated with respective links between the second UE and one or more of the subset of network entities and to reduce the signal metric associated with respective links of other network entities of the set of multiple network entities.

In some examples, to support adjusting the set of configurable intelligent surfaces to the first configuration or to the second configuration, the configurable intelligent surface adjustment component 775 may be configured as or otherwise support a means for adjusting an angle of transmission of one or more of the set of configurable intelligent surfaces, adjusting a mode of operation of one or more of the set of configurable intelligent surfaces between a reflective mode or a transmissive mode, or adjusting a phase of one or more of the set of configurable intelligent surfaces.

In some examples, the machine learning component 780 may be configured as or otherwise support a means for determining the first configuration, the second configuration, or both based on a machine learning model that receives measurement reports as input.

In some examples, the measurement occasion component 765 may be configured as or otherwise support a means for transmitting, to the second UE, an indication of one or more measurement occasions, where the measurement report includes measurements for the one or more measurement occasions.

In some examples, the one or more measurement occasions include at least one measurement occasion during the data period.

In some examples, the measurement occasion component 765 may be configured as or otherwise support a means for determining the one or more measurement occasions based on the indication of the tracking period and the data period.

Figure 8:
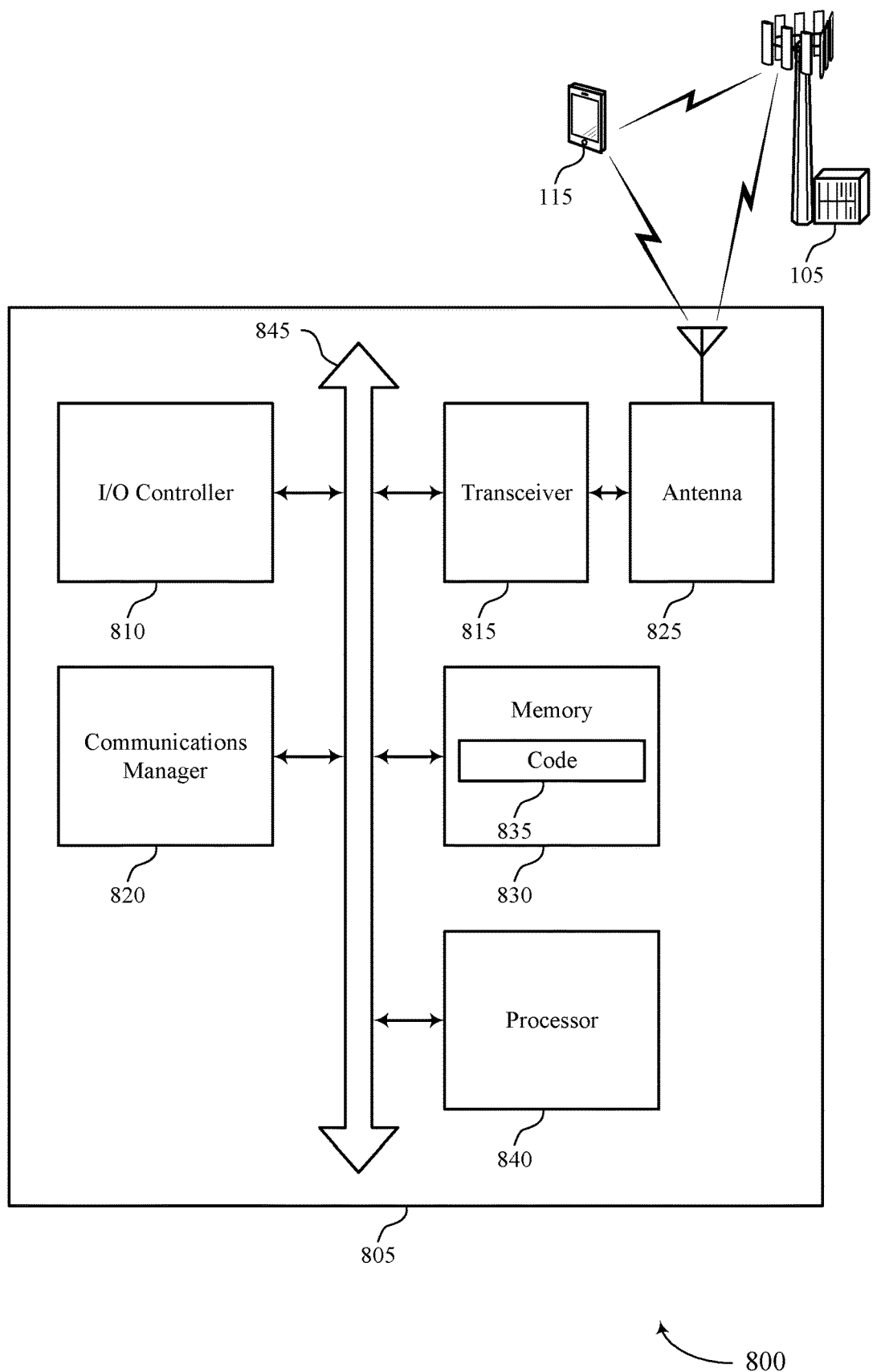
FIG. 8 shows a diagram of a system including a device that supports intelligent surface enabled techniques for interference management in accordance with one or more aspects of the present disclosure.

FIG. 8 shows a diagram of a system 800 including a device 805 that supports intelligent surface enabled techniques for interference management in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include the antenna 825. However, in some other cases, the device 805 may have more than one antenna (e.g., antenna 825), which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting intelligent surface enabled techniques for interference management). For example, the device 805 or a component of the device 805 may include a processor 840 and memory 830 coupled with or to the processor 840, the processor 840 and memory 830 configured to perform various functions described herein.

The communications manager 820 may support wireless communications at a first UE in accordance with examples as disclosed herein. For example, the communications manager 820 may be configured as or otherwise support a means for transmitting, to a second UE associated with a set of configurable intelligent surfaces, first information that indicates a tracking period and a data period that the second UE is to use for management of the set of configurable intelligent surfaces. The communications manager 820 may be configured as or otherwise support a means for communicating, via the set of configurable intelligent surfaces, with a set of multiple network entities during the tracking period. The communications manager 820 may be configured as or otherwise support a means for transmitting, to the second UE, second information indicating a measurement report associated with the communicating during the tracking period. The communications manager 820 may be configured as or otherwise support a means for communicating, via the set of configurable intelligent surfaces and based on the measurement report, with a subset of network entities of the set of multiple network entities during the data period.

Additionally, or alternatively, the communications manager 820 may support wireless communications at a first UE in accordance with examples as disclosed herein. For example, the communications manager 820 may be configured as or otherwise support a means for receiving, from a second UE, first information that indicates a tracking period and a data period that the first UE is to use for management of a set of configurable intelligent surfaces. The communications manager 820 may be configured as or otherwise support a means for adjusting the set of configurable intelligent surfaces to a first configuration for a first communication between the second UE and a set of multiple network entities to occur during the tracking period. The communications manager 820 may be configured as or otherwise support a means for receiving, from the second UE, signaling indicating a measurement report associated with the first communication occurring during the tracking period. The communications manager 820 may be configured as or otherwise support a means for adjusting, based on the measurement report, the set of configurable intelligent surfaces to a second configuration for a second communication between the second UE and a subset of network entities of the set of multiple network entities to occur during the data period.

By including or configuring the communications manager 820 in accordance with examples as described herein, the device 805 may support techniques for improved communication reliability and improved user experience due to reduced processing. For example, by using UEs to control configurable intelligent surfaces to support communications between a UE and a network entity, interference may be reduced and communications may be more reliable and efficient.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of intelligent surface enabled techniques for interference management as described herein, or the processor 840 and the memory 830 may be otherwise configured to perform or support such operations.

Figure 9:
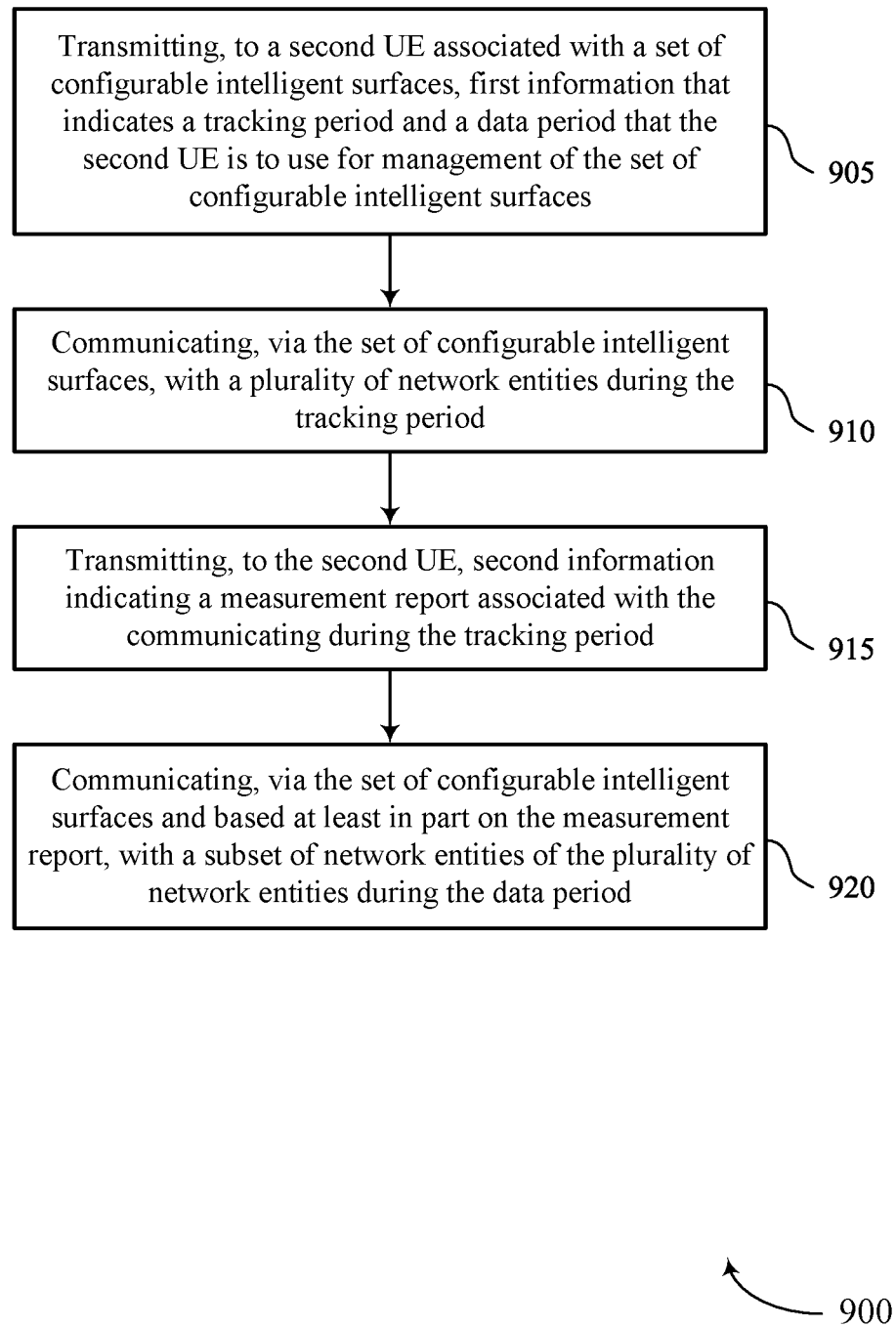
FIGS. 9 through 12 show flowcharts illustrating methods that support intelligent surface enabled techniques for interference management in accordance with one or more aspects of the present disclosure.

FIG. 9 shows a flowchart illustrating a method 900 that supports intelligent surface enabled techniques for interference management in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include transmitting, to a second UE associated with a set of configurable intelligent surfaces, first information that indicates a tracking period and a data period that the second UE is to use for management of the set of configurable intelligent surfaces. The operations of 905 may be performed in accordance with examples as disclosed herein. In some examples, aspects of the operations of 905 may be performed by a period configuration component 725 as described with reference to FIG. 7.

At 910, the method may include communicating, via the set of configurable intelligent surfaces, with a set of multiple network entities during the tracking period. The operations of 910 may be performed in accordance with examples as disclosed herein. In some examples, aspects of the operations of 910 may be performed by a tracking period component 730 as described with reference to FIG. 7.

At 915, the method may include transmitting, to the second UE, second information indicating a measurement report associated with the communicating during the tracking period. The operations of 915 may be performed in accordance with examples as disclosed herein. In some examples, aspects of the operations of 915 may be performed by a measurement report interface 735 as described with reference to FIG. 7.

At 920, the method may include communicating, via the set of configurable intelligent surfaces and based on the measurement report, with a subset of network entities of the set of multiple network entities during the data period. The operations of 920 may be performed in accordance with examples as disclosed herein. In some examples, aspects of the operations of 920 may be performed by a data period component 740 as described with reference to FIG. 7.

Figure 10:
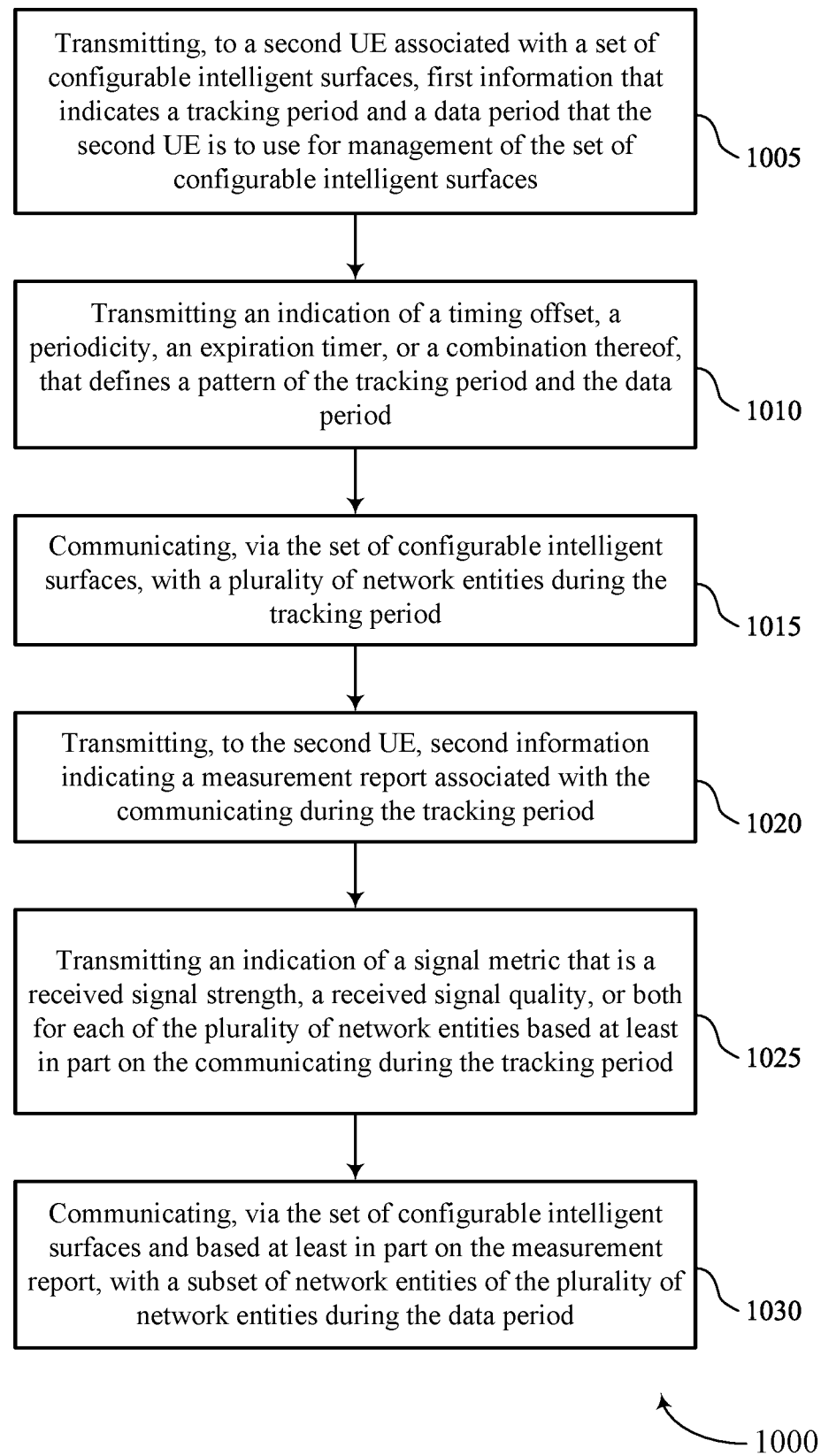

FIG. 10 shows a flowchart illustrating a method 1000 that supports intelligent surface enabled techniques for interference management in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include transmitting, to a second UE associated with a set of configurable intelligent surfaces, first information that indicates a tracking period and a data period that the second UE is to use for management of the set of configurable intelligent surfaces. The operations of 1005 may be performed in accordance with examples as disclosed herein. In some examples, aspects of the operations of 1005 may be performed by a period configuration component 725 as described with reference to FIG. 7.

At 1010, the method may include transmitting an indication of a timing offset, a periodicity, an expiration timer, or a combination thereof, that defines a pattern of the tracking period and the data period. The operations of 1010 may be performed in accordance with examples as disclosed herein. In some examples, aspects of the operations of 1010 may be performed by a period configuration component 725 as described with reference to FIG. 7.

At 1015, the method may include communicating, via the set of configurable intelligent surfaces, with a set of multiple network entities during the tracking period. The operations of 1015 may be performed in accordance with examples as disclosed herein. In some examples, aspects of the operations of 1015 may be performed by a tracking period component 730 as described with reference to FIG. 7.

At 1020, the method may include transmitting, to the second UE, second information indicating a measurement report associated with the communicating during the tracking period. The operations of 1020 may be performed in accordance with examples as disclosed herein. In some examples, aspects of the operations of 1020 may be performed by a measurement report interface 735 as described with reference to FIG. 7.

At 1025, the method may include transmitting an indication of a signal metric that is a received signal strength, a received signal quality, or both for each of the set of multiple network entities based on the communicating during the tracking period. The operations of 1025 may be performed in accordance with examples as disclosed herein. In some examples, aspects of the operations of 1025 may be performed by a measurement report interface 735 as described with reference to FIG. 7.

At 1030, the method may include communicating, via the set of configurable intelligent surfaces and based on the measurement report, with a subset of network entities of the set of multiple network entities during the data period. The operations of 1030 may be performed in accordance with examples as disclosed herein. In some examples, aspects of the operations of 1030 may be performed by a data period component 740 as described with reference to FIG. 7.

Figure 11:
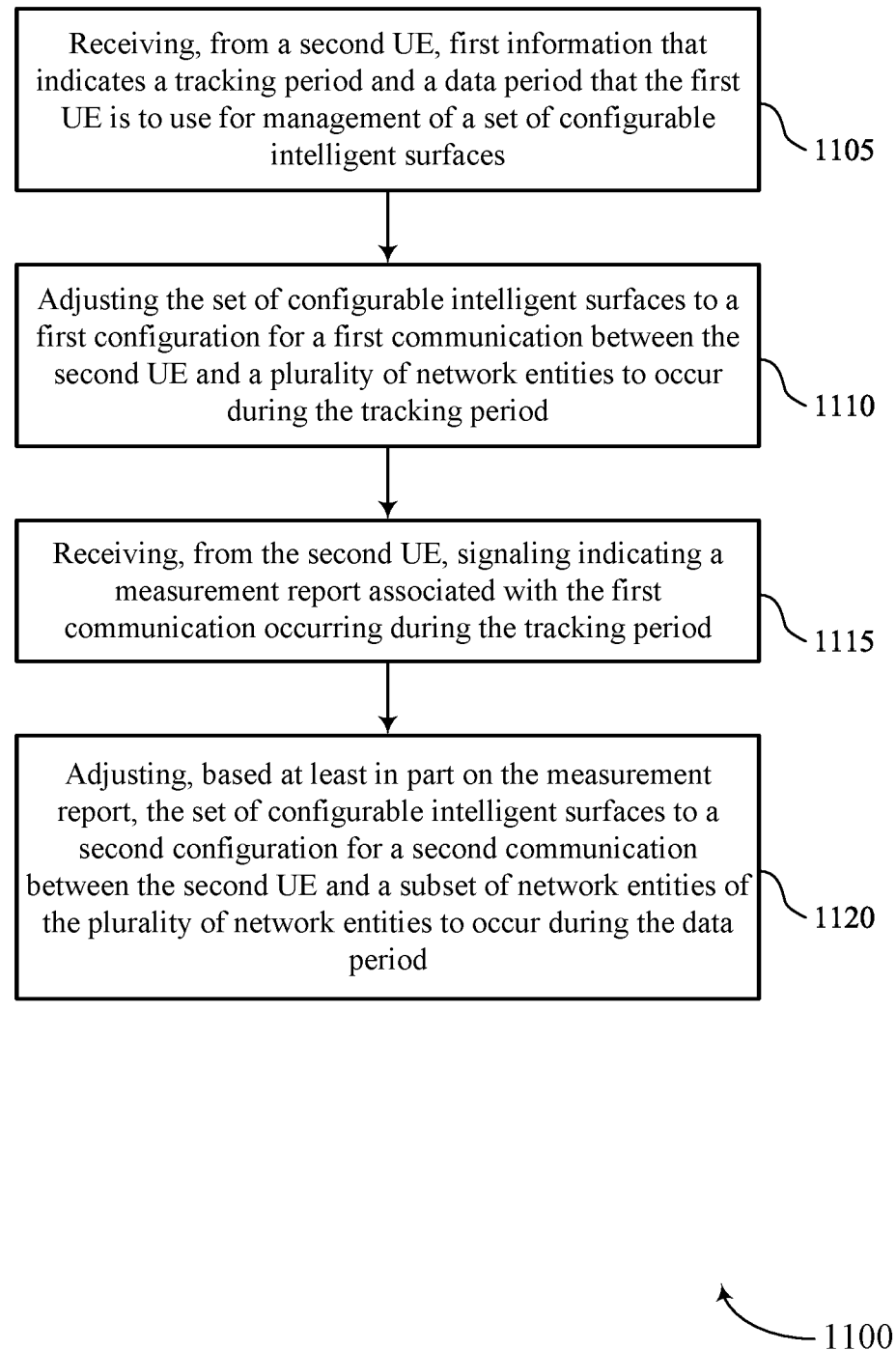

FIG. 11 shows a flowchart illustrating a method 1100 that supports intelligent surface enabled techniques for interference management in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving, from a second UE, first information that indicates a tracking period and a data period that the first UE is to use for management of a set of configurable intelligent surfaces. The operations of 1105 may be performed in accordance with examples as disclosed herein. In some examples, aspects of the operations of 1105 may be performed by a period configuration component 725 as described with reference to FIG. 7.

At 1110, the method may include adjusting the set of configurable intelligent surfaces to a first configuration for a first communication between the second UE and a set of multiple network entities to occur during the tracking period. The operations of 1110 may be performed in accordance with examples as disclosed herein. In some examples, aspects of the operations of 1110 may be performed by a tracking period component 730 as described with reference to FIG. 7.

At 1115, the method may include receiving, from the second UE, signaling indicating a measurement report associated with the first communication occurring during the tracking period. The operations of 1115 may be performed in accordance with examples as disclosed herein. In some examples, aspects of the operations of 1115 may be performed by a measurement report interface 735 as described with reference to FIG. 7.

At 1120, the method may include adjusting, based on the measurement report, the set of configurable intelligent surfaces to a second configuration for a second communication between the second UE and a subset of network entities of the set of multiple network entities to occur during the data period. The operations of 1120 may be performed in accordance with examples as disclosed herein. In some examples, aspects of the operations of 1120 may be performed by a data period component 740 as described with reference to FIG. 7.

Figure 12:
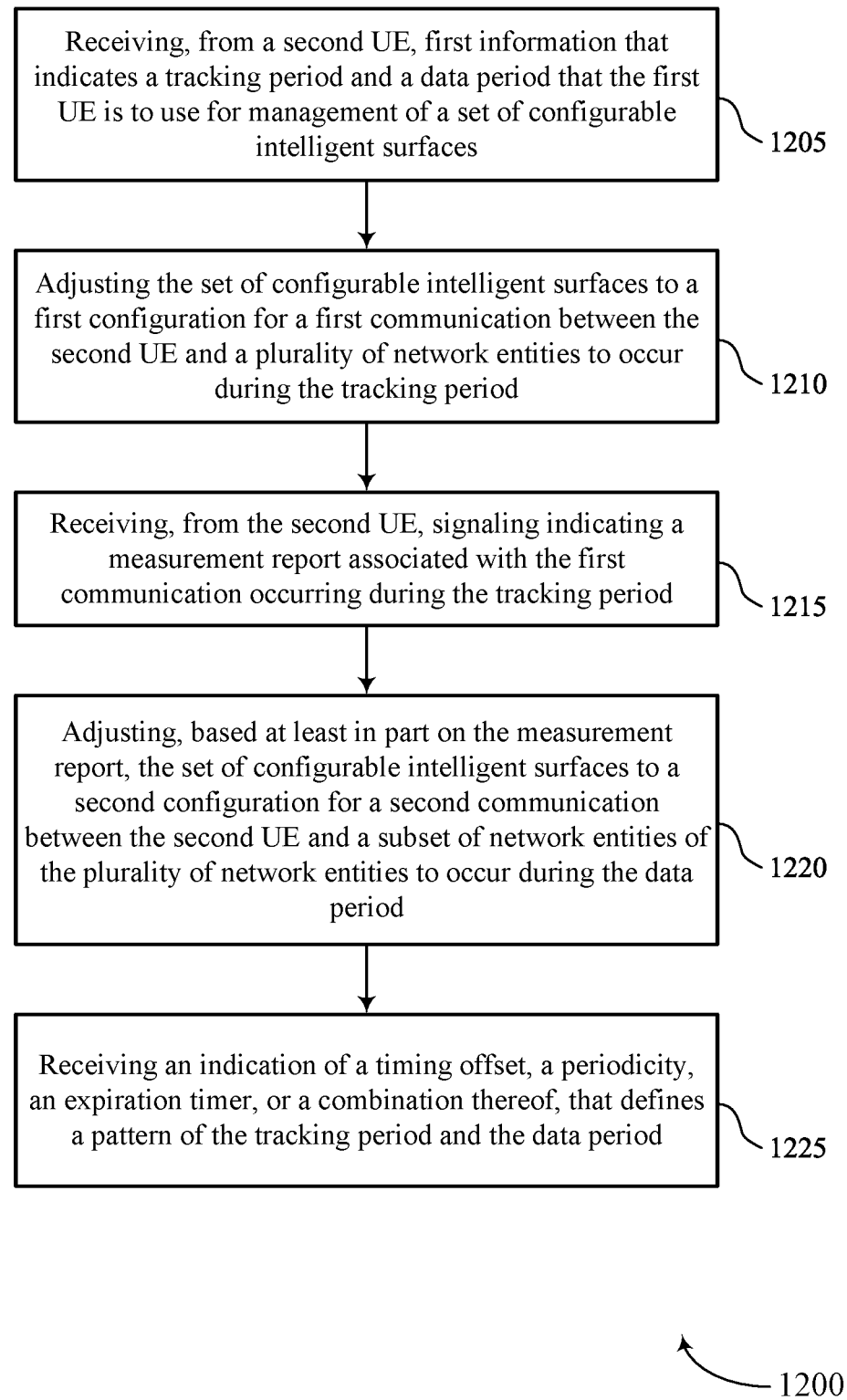

FIG. 12 shows a flowchart illustrating a method 1200 that supports intelligent surface enabled techniques for interference management in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving, from a second UE, first information that indicates a tracking period and a data period that the first UE is to use for management of a set of configurable intelligent surfaces. The operations of 1205 may be performed in accordance with examples as disclosed herein. In some examples, aspects of the operations of 1205 may be performed by a period configuration component 725 as described with reference to FIG. 7.

At 1210, the method may include adjusting the set of configurable intelligent surfaces to a first configuration for a first communication between the second UE and a set of multiple network entities to occur during the tracking period. The operations of 1210 may be performed in accordance with examples as disclosed herein. In some examples, aspects of the operations of 1210 may be performed by a tracking period component 730 as described with reference to FIG. 7.

At 1215, the method may include receiving, from the second UE, signaling indicating a measurement report associated with the first communication occurring during the tracking period. The operations of 1215 may be performed in accordance with examples as disclosed herein. In some examples, aspects of the operations of 1215 may be performed by a measurement report interface 735 as described with reference to FIG. 7.

At 1220, the method may include adjusting, based on the measurement report, the set of configurable intelligent surfaces to a second configuration for a second communication between the second UE and a subset of network entities of the set of multiple network entities to occur during the data period. The operations of 1220 may be performed in accordance with examples as disclosed herein. In some examples, aspects of the operations of 1220 may be performed by a data period component 740 as described with reference to FIG. 7.

At 1225, the method may include receiving an indication of a timing offset, a periodicity, an expiration timer, or a combination thereof, that defines a pattern of the tracking period and the data period. The operations of 1225 may be performed in accordance with examples as disclosed herein. In some examples, aspects of the operations of 1225 may be performed by a period configuration component 725 as described with reference to FIG. 7.

The following provides an overview of aspects of the present disclosure:

Aspect 1: A method for wireless communications at a first UE, comprising: transmitting, to a second UE associated with a set of configurable intelligent surfaces, first information that indicates a tracking period and a data period that the second UE is to use for management of the set of configurable intelligent surfaces; communicating, via the set of configurable intelligent surfaces, with a plurality of network entities during the tracking period; transmitting, to the second UE, second information indicating a measurement report associated with the communicating during the tracking period; and communicating, via the set of configurable intelligent surfaces and based at least in part on the measurement report, with a subset of network entities of the plurality of network entities during the data period.

Aspect 2: The method of aspect 1, wherein transmitting the first information that indicates the tracking period and the data period comprises: transmitting an indication of a timing offset, a periodicity, an expiration timer, or a combination thereof, that defines a pattern of the tracking period and the data period.

Aspect 3: The method of any of aspects 1 through 2, wherein transmitting the second information indicating the measurement report comprises: transmitting, to the second UE, a request that the second UE perform an interference cancellation adjustment to the set of configurable intelligent surfaces.

Aspect 4: The method of any of aspects 1 through 3, wherein transmitting the second information indicating the measurement report comprises: transmitting signaling indicating the measurement report based at least in part on determining that a secondary cell is within a threshold receive power of a primary cell receive power.

Aspect 5: The method of any of aspects 1 through 4, wherein transmitting the second information indicating the measurement report comprises: transmitting an indication of a signal metric that is a received signal strength, a received signal quality, or both for each of the plurality of network entities based at least in part on the communicating during the tracking period.

Aspect 6: The method of aspect 5, wherein the measurement report indicates the signal metric relative to a prior measurement of the signal metric for each of the plurality of network entities.

Aspect 7: The method of any of aspects 1 through 6, further comprising: transmitting, to the second UE, an indication of second measurement report associated with the communicating with the subset of the network entities during the data period.

Aspect 8: The method of aspect 7, wherein transmitting the second information indicating the measurement report comprises: transmitting an indication of a signal metric associated with data reception during the data period, wherein the signal metric is received signal strength associated with the data reception during the data period, a received signal quality associated with data reception during the data period, or both.

Aspect 9: The method of aspect 8, wherein the second measurement report indicates the signal metric relative to a prior measurement of the signal metric for the subset of network entities.

Aspect 10: The method of any of aspects 1 through 9, further comprising: transmitting, to the second UE, location information associated with one or more network entities of the plurality of network entities relative to the first UE.

Aspect 11: The method of aspect 10, wherein the location information indicates a distance metric or a zone identifier associated with each of the one or more network entities.

Aspect 12: The method of any of aspects 10 through 11, wherein the location information indicates that each of the one or more network entities is a primary network entity or a secondary network entity.

Aspect 13: The method of aspect 12, wherein each of the one or more network entities is indicated as the primary network entity or the second network entity on a data occasion basis.

Aspect 14: The method of any of aspects 1 through 13, further comprising: receiving, from the second UE, an indication of an increased interference for a period.

Aspect 15: The method of aspect 14, further comprising: transmitting, to a base station based at least in part on receiving the indication of increased interference, control signaling including an indication of the increased interference for the period.

Aspect 16: The method of any of aspects 14 through 15, further comprising: reducing a data rate for communications during the period.

Aspect 17: The method of any of aspects 1 through 16, wherein transmitting the second information indicating measurement report comprises: transmitting the second information over a side channel with the second UE, wherein the side channel is a Bluetooth communication link, a Wi-fi link, a cellular sidelink, or a vehicle-to-everything communication link.

Aspect 18: The method of any of aspects 1 through 17, further comprising: receiving, from the second UE, an indication of one or more measurement occasions, wherein the measurement report includes measurements for the one or more measurement occasions.

Aspect 19: The method of aspect 18, wherein the one or more measurement occasions include at least one measurement occasion during the data period.

Aspect 20: A method for wireless communications at a first UE, comprising: receiving, from a second UE, first information that indicates a tracking period and a data period that the first UE is to use for management of a set of configurable intelligent surfaces; adjusting the set of configurable intelligent surfaces to a first configuration for a first communication between the second UE and a plurality of network entities to occur during the tracking period; receiving, from the second UE, signaling indicating a measurement report associated with the first communication occurring during the tracking period; and adjusting, based at least in part on the measurement report, the set of configurable intelligent surfaces to a second configuration for a second communication between the second UE and a subset of network entities of the plurality of network entities to occur during the data period.

Aspect 21: The method of aspect 20, wherein receiving the first information that indicates the tracking period and the data period comprises: receiving an indication of a timing offset, a periodicity, an expiration timer, or a combination thereof, that defines a pattern of the tracking period and the data period.

Aspect 22: The method of any of aspects 20 through 21, wherein receiving the second information indicating the measurement report comprises: receiving a request that the first UE perform an interference cancellation adjustment to the set of configurable intelligent surfaces, wherein the second configuration is based at least in part on the request.

Aspect 23: The method of any of aspects 20 through 22, wherein receiving the second information indicating the measurement report comprises: receiving an indication of a signal metric that is a received signal strength, a received signal quality, or both for each of the plurality of network entities based at least in part on the communicating during the tracking period.

Aspect 24: The method of aspect 23, wherein the measurement report indicates the signal metric relative to a prior measurement of the signal metric for each of the plurality of network entities.

Aspect 25: The method of any of aspects 20 through 24, further comprising: receiving, from the second UE, an indication of second measurement report associated with the communicating with the subset of the network entities during the data period.

Aspect 26: The method of aspect 25, wherein receiving the indication of the second measurement report comprises: receiving, from the second UE, an indication of a signal metric associated with data reception during the data period, wherein the signal metric is received signal strength associated with the data reception during the data period, a received signal quality associated with the data reception during the data period, or both.

Aspect 27: The method of aspect 26, wherein the second measurement report indicates the signal metric relative to a prior measurement of the signal metric for the subset of network entities.

Aspect 28: The method of any of aspects 20 through 27, further comprising: receiving, from the second UE, signaling indicating distance information associated with one or more network entities of the plurality of network entities relative to the second UE.

Aspect 29: The method of aspect 28, wherein the distance information indicates a zone identifier associated with each of the one or more network entities.

Aspect 30: The method of any of aspects 28 through 29, wherein the distance information indicates that each of the one or more network entities is a primary network entity or a secondary network entity.

Aspect 31: The method of any of aspects 20 through 30, further comprising: transmitting, to the second UE, an indication of an increased interference for a period.

Aspect 32: The method of aspect 31, further comprising: determining, based at least in part on the measurement report, location information, sensor information, or a combination thereof, that the second UE is entering a high interference region, wherein the indication of the increased interference is transmitted based at least in part on determining that the second UE is entering the high interference region.

Aspect 33: The method of any of aspects 31 through 32, wherein transmitting the indication of the increased interference comprises: transmitting an indication that the set of configurable intelligent surfaces are unavailable for interference cancellation, signal boosting, or both, during the period.

Aspect 34: The method of any of aspects 20 through 33, wherein receiving the second information indicating the measurement report comprises: receiving the signaling over a sidelink channel with the second UE, wherein the sidelink channel is a Bluetooth communication link, a Wi-fi link, a cellular sidelink, or a vehicle-to-everything communication link.

Aspect 35: The method of any of aspects 20 through 34, wherein adjusting the set of configurable intelligent surfaces to the first configuration comprises: adjusting the set of configurable intelligent surfaces to increase a signal metric associated with respective links between the second UE and each of the plurality of network entities.

Aspect 36: The method of any of aspects 20 through 35, wherein adjusting the set of configurable intelligent surfaces to the second configuration comprises: adjusting the set of configurable intelligent surfaces to increase a signal metric associated with respective links between the second UE and one or more of the subset of network entities and to reduce the signal metric associated with respective links of other network entities of the plurality of network entities.

Aspect 37: The method of any of aspects 20 through 36, wherein adjusting the set of configurable intelligent surfaces to the first configuration or to the second configuration comprises: adjusting an angle of transmission of one or more of the set of configurable intelligent surfaces, adjusting a mode of operation of one or more of the set of configurable intelligent surfaces between a reflective mode or a transmissive mode, or adjusting a phase of one or more of the set of configurable intelligent surfaces.

Aspect 38: The method of any of aspects 20 through 37, further comprising: determining the first configuration, the second configuration, or both based at least in part on a machine learning model that receives measurement reports as input.

Aspect 39: The method of any of aspects 20 through 38, further comprising: transmitting, to the second UE, an indication of one or more measurement occasions, wherein the measurement report includes measurements for the one or more measurement occasions.

Aspect 40: The method of aspect 39, wherein the one or more measurement occasions include at least one measurement occasion during the data period.

Aspect 41: The method of any of aspects 39 through 40, further comprising: determining the one or more measurement occasions based at least in part on the indication of the tracking period and the data period.

Aspect 42: An apparatus for wireless communications at a first UE, comprising a processor; memory coupled with the processor; and instructions stored in the memory and executable by the processor to cause the apparatus to perform a method of any of aspects 1 through 19.

Aspect 43: An apparatus for wireless communications at a first UE, comprising at least one means for performing a method of any of aspects 1 through 19.

Aspect 44: A non-transitory computer-readable medium storing code for wireless communications at a first UE, the code comprising instructions executable by a processor to perform a method of any of aspects 1 through 19.

Aspect 45: An apparatus for wireless communications at a first UE, comprising a processor; memory coupled with the processor; and instructions stored in the memory and executable by the processor to cause the apparatus to perform a method of any of aspects 20 through 41.

Aspect 46: An apparatus for wireless communications at a first UE, comprising at least one means for performing a method of any of aspects 20 through 41.

Aspect 47: A non-transitory computer-readable medium storing code for wireless communications at a first UE, the code comprising instructions executable by a processor to perform a method of any of aspects 20 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting, to a second UE associated with a set of configurable intelligent surfaces, first information that indicates a tracking period and a data period that the second UE is to use for management of the set of configurable intelligent surfaces;
   communicating, via the set of configurable intelligent surfaces, with a plurality of network entities during the tracking period;
   transmitting, to the second UE, second information indicating a measurement report associated with the communicating during the tracking period; and
   communicating, via the set of configurable intelligent surfaces and based at least in part on the measurement report, with a subset of network entities of the plurality of network entities during the data period.

2. The method of claim 1, wherein transmitting the first information that indicates the tracking period and the data period comprises:
   transmitting an indication of a timing offset, a periodicity, an expiration timer, or a combination thereof, that defines a pattern of the tracking period and the data period.

3. The method of claim 1, wherein transmitting the second information indicating the measurement report comprises:
   transmitting, to the second UE, a request that the second UE perform an interference cancellation adjustment to the set of configurable intelligent surfaces.

4. The method of claim 1, wherein transmitting the second information indicating the measurement report comprises:
   transmitting signaling indicating the measurement report based at least in part on determining that a secondary cell is within a threshold receive power of a primary cell receive power.

5. The method of claim 1, wherein transmitting the second information indicating the measurement report comprises:
   transmitting an indication of a signal metric that is a received signal strength, a received signal quality, or both for each of the plurality of network entities based at least in part on the communicating during the tracking period.

6. The method of claim 5, wherein the measurement report indicates the signal metric relative to a prior measurement of the signal metric for each of the plurality of network entities.

7. The method of claim 1, further comprising:
   transmitting, to the second UE, an indication of second measurement report associated with the communicating with the subset of the network entities during the data period.

8. The method of claim 7, wherein transmitting the second information indicating the measurement report comprises:
   transmitting an indication of a signal metric associated with data reception during the data period, wherein the signal metric is received signal strength associated with the data reception during the data period, a received signal quality associated with data reception during the data period, or both.

9. The method of claim 8, wherein the second measurement report indicates the signal metric relative to a prior measurement of the signal metric for the subset of network entities.

10. The method of claim 1, further comprising:
    transmitting, to the second UE, location information associated with one or more network entities of the plurality of network entities relative to the first UE.

11. The method of claim 10, wherein the location information indicates a distance metric or a zone identifier associated with each of the one or more network entities.

12. The method of claim 10, wherein the location information indicates that each of the one or more network entities is a primary network entity or a secondary network entity.

13. The method of claim 12, wherein each of the one or more network entities is indicated as the primary network entity or the second network entity on a data occasion basis.

14. The method of claim 1, further comprising:
    receiving, from the second UE, an indication of an increased interference for a period.

15. The method of claim 14, further comprising:
    transmitting, to a base station based at least in part on receiving the indication of increased interference, control signaling including an indication of the increased interference for the period.

16. The method of claim 14, further comprising:
    reducing a data rate for communications during the period.

17. The method of claim 1, wherein transmitting the second information indicating measurement report comprises:
    transmitting the second information over a side channel with the second UE, wherein the side channel is a Bluetooth communication link, a Wi-fi link, a cellular sidelink, or a vehicle-to-everything communication link.

18. The method of claim 1, further comprising:
    receiving, from the second UE, an indication of one or more measurement occasions, wherein the measurement report includes measurements for the one or more measurement occasions.

19. The method of claim 18, wherein the one or more measurement occasions include at least one measurement occasion during the data period.

20. A method for wireless communications at a first user equipment (UE), comprising:
    receiving, from a second UE, first information that indicates a tracking period and a data period that the first UE is to use for management of a set of configurable intelligent surfaces;
    adjusting the set of configurable intelligent surfaces to a first configuration for a first communication between the second UE and a plurality of network entities to occur during the tracking period;
    receiving, from the second UE, signaling indicating a measurement report associated with the first communication occurring during the tracking period; and
    adjusting, based at least in part on the measurement report, the set of configurable intelligent surfaces to a second configuration for a second communication between the second UE and a subset of network entities of the plurality of network entities to occur during the data period.

21. The method of claim 20, further comprising:
    transmitting, to the second UE, an indication of an increased interference for a period.

22. The method of claim 21, further comprising:
    determining, based at least in part on the measurement report, location information, sensor information, or a combination thereof, that the second UE is entering a high interference region, wherein the indication of the increased interference is transmitted based at least in part on determining that the second UE is entering the high interference region.

23. The method of claim 20, wherein adjusting the set of configurable intelligent surfaces to the first configuration comprises:
adjusting the set of configurable intelligent surfaces to increase a signal metric associated with respective links between the second UE and each of the plurality of network entities.

24. The method of claim 20, wherein adjusting the set of configurable intelligent surfaces to the second configuration comprises:
adjusting the set of configurable intelligent surfaces to increase a signal metric associated with respective links between the second UE and one or more of the subset of network entities and to reduce the signal metric associated with respective links of other network entities of the plurality of network entities.

25. The method of claim 20, wherein adjusting the set of configurable intelligent surfaces to the first configuration or to the second configuration comprises:
adjusting an angle of transmission of one or more of the set of configurable intelligent surfaces, adjusting a mode of operation of one or more of the set of configurable intelligent surfaces between a reflective mode or a transmissive mode, or adjusting a phase of one or more of the set of configurable intelligent surfaces.

26. The method of claim 20, further comprising:
determining the first configuration, the second configuration, or both based at least in part on a machine learning model that receives measurement reports as input.

27. The method of claim 20, further comprising:
transmitting, to the second UE, an indication of one or more measurement occasions, wherein the measurement report includes measurements for the one or more measurement occasions.

28. The method of claim 27, wherein the one or more measurement occasions include at least one measurement occasion during the data period.

29. An apparatus for wireless communications at a first user equipment (UE), comprising:
a processor;
memory coupled with the processor; and
instructions stored in the memory and executable by the processor to cause the apparatus to:
transmit, to a second UE associated with a set of configurable intelligent surfaces, first information that indicates a tracking period and a data period that the second UE is to use for management of the set of configurable intelligent surfaces;
communicate, via the set of configurable intelligent surfaces, with a plurality of network entities during the tracking period;
transmit, to the second UE, second information indicating a measurement report associated with the communicating during the tracking period; and
communicate, via the set of configurable intelligent surfaces and based at least in part on the measurement report, with a subset of network entities of the plurality of network entities during the data period.

30. An apparatus for wireless communications at a first user equipment (UE), comprising:
a processor;
memory coupled with the processor; and
instructions stored in the memory and executable by the processor to cause the apparatus to:
receive, from a second UE, first information that indicates a tracking period and a data period that the first UE is to use for management of a set of configurable intelligent surfaces;
adjust the set of configurable intelligent surfaces to a first configuration for a first communication between the second UE and a plurality of network entities to occur during the tracking period;
receive, from the second UE, signaling indicating a measurement report associated with the first communication occurring during the tracking period; and
adjust, based at least in part on the measurement report, the set of configurable intelligent surfaces to a second configuration for a second communication between the second UE and a subset of network entities of the plurality of network entities to occur during the data period.

* * * * *